US012720568B2

(12) United States Patent
Zagalsky et al.

(10) Patent No.: US 12,720,568 B2
(45) Date of Patent: Aug. 25, 2026

(54) LAST TRANSMISSION INDICATIONS

(71) Applicant: QUALCOMM Incorporated, San Diego, CA (US)

(72) Inventors: Yevgeny Zagalsky, Karmey Yosef (IL); Ran Berliner, Kfar Aviv (IL); Konstantin Kupershlak, Ramat Gan (IL); Eitan Yerushalmi, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 359 days.

(21) Appl. No.: 18/523,091

(22) Filed: Nov. 29, 2023

(65) Prior Publication Data

US 2025/0175994 A1 May 29, 2025

(51) Int. Cl.

| | |
|---|---|
| ***H04W 72/232*** | (2023.01) |
| ***H04L 1/08*** | (2006.01) |
| ***H04L 1/1812*** | (2023.01) |
| ***H04W 72/12*** | (2023.01) |

(52) U.S. Cl.

CPC ............. *H04W 72/232* (2023.01); *H04L 1/08* (2013.01); *H04L 1/1812* (2013.01); *H04W 72/12* (2013.01)

(58) Field of Classification Search

CPC ...... H04W 72/232; H04W 72/12; H04L 1/08; H04L 1/1812; H04L 1/1822

See application file for complete search history.

(56) References Cited

U.S. PATENT DOCUMENTS

| | | | | |
|---|---|---|---|---|
| 2018/0049121 | A1* | 2/2018 | Yamada | H04W 52/0216 |
| 2020/0313802 | A1* | 10/2020 | Xu | H04L 1/1812 |
| 2021/0360523 | A1* | 11/2021 | Hwang | H04L 5/0091 |
| 2023/0007527 | A1* | 1/2023 | Baek | H04W 80/06 |
| 2023/0371039 | A1* | 11/2023 | Tsai | H04W 72/232 |
| 2025/0175979 | A1* | 5/2025 | Löhr | H04L 1/1883 |

* cited by examiner

*Primary Examiner* — Yu-Wen Chang

(74) *Attorney, Agent, or Firm* — QUALCOMM Incorporated

(57) ABSTRACT

In some examples of the techniques described herein, a network entity may transmit a last transmission indication for a channel grant. The last transmission indication may indicate a last transmission (e.g., last packet of a retransmission) of a current data transmission to be communicated. In some approaches, the last transmission indication may allow a user equipment (UE) to improve a residual physical downlink shared channel (PDSCH) block error ratio (BLER) by prioritizing handling of a last transmission. Additionally, or alternatively, the UE may increase memory (e.g., buffer) utilization efficiency by deleting data stored for retransmission. In some examples, the UE may reduce power consumption by skipping a retransmission timer in connected mode discontinuous reception (C-DRX) without a forthcoming retransmission. In some scenarios, the UE may utilize the last transmission indication to determine whether received data corresponds to a retransmission or to a new transmission.

28 Claims, 17 Drawing Sheets

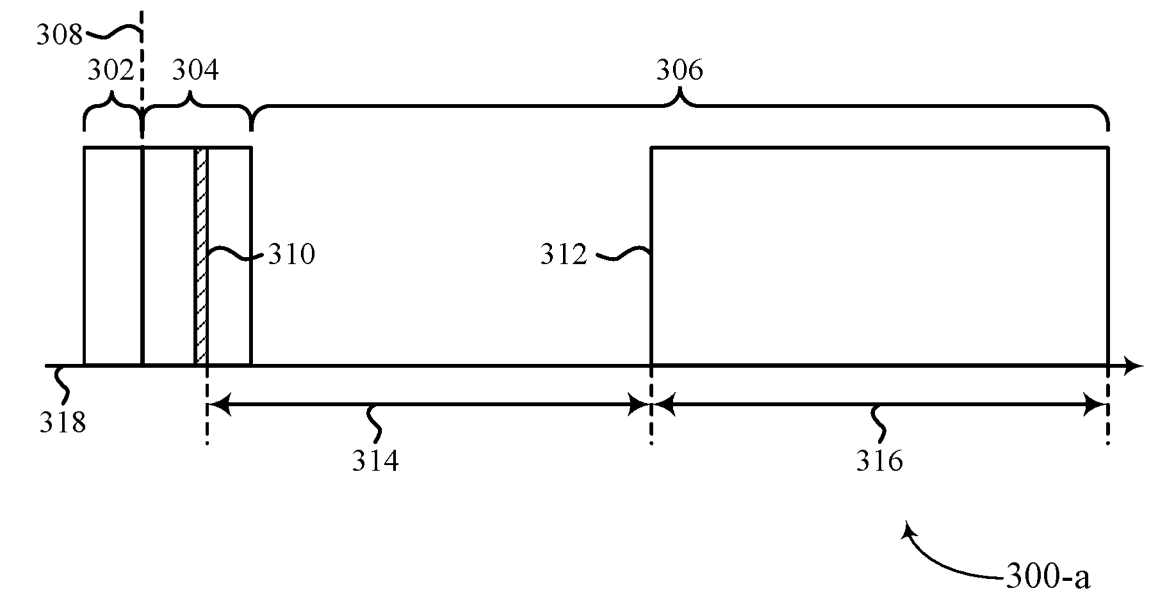
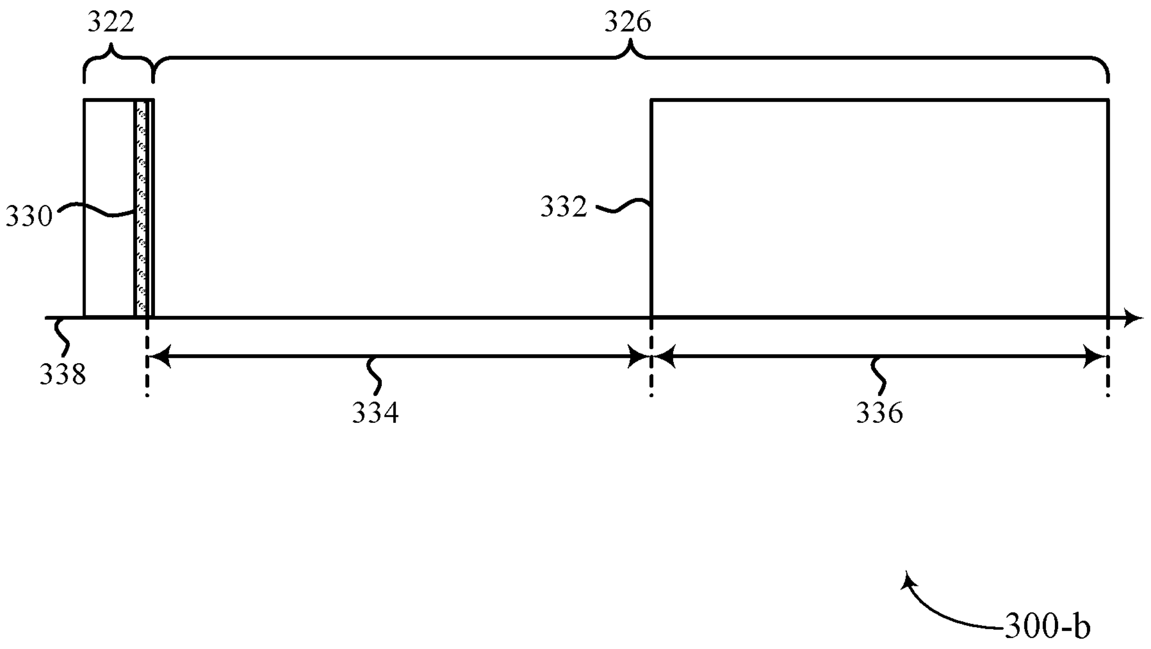
FIG. 3

Output a downlink control message indicating a grant of channel resources for communication between the network entity and a UE, the downlink control message further indicating last transmission information corresponding to a last packet for a HARQ process associated with the grant of channel resources

1605

Output data associated with the HARQ process based on the last transmission information

1610

1600

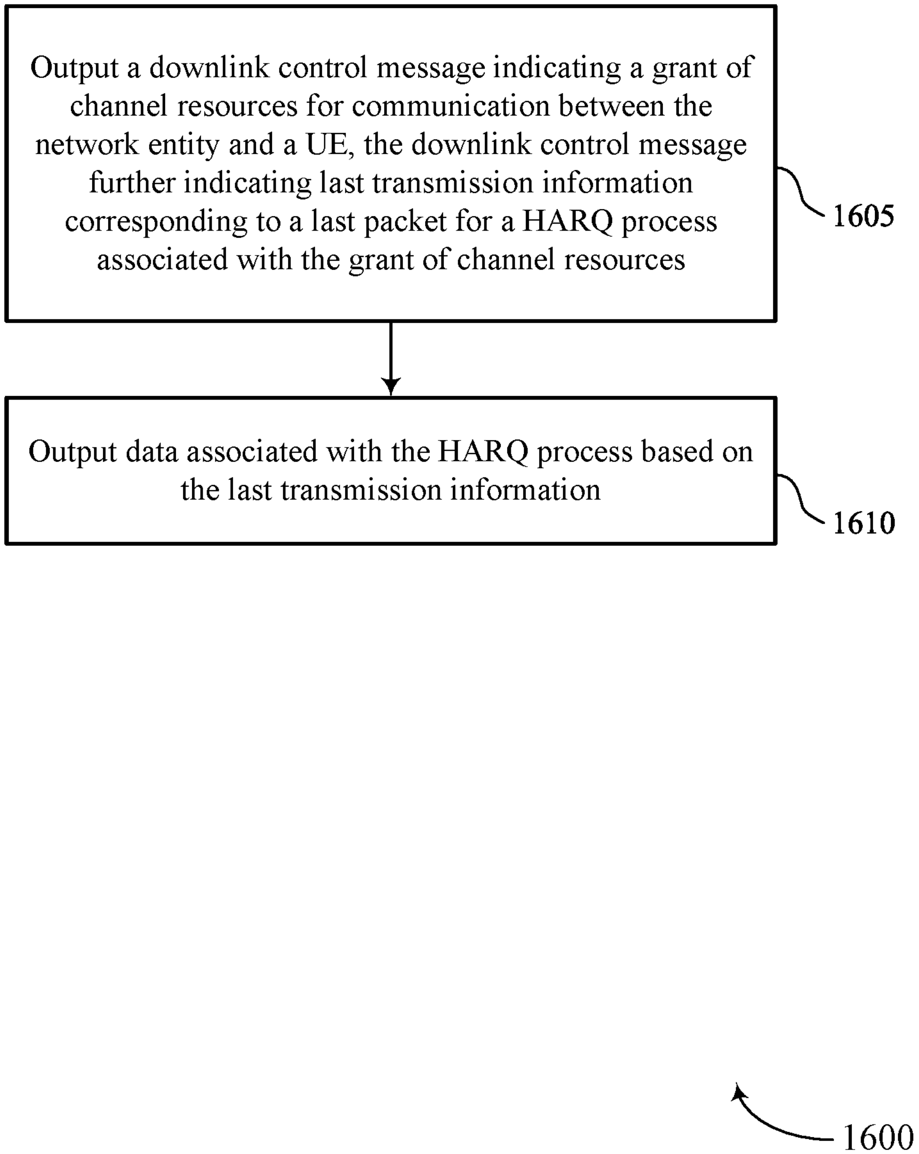

FIG. 16

LAST TRANSMISSION INDICATIONS

FIELD OF TECHNOLOGY

The following relates to wireless communications, including last transmission indications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

Some wireless communication systems utilize hybrid automatic repeat request (HARQ) techniques for retransmission of data. When decoding fails for a packet of data, the data may be retransmitted in accordance with HARQ techniques to provide increased communication reliability. For example, a user equipment (UE) may receive a physical downlink control channel (PDCCH) with downlink control information (DCI) indicating a HARQ process identifier (e.g., "HARQ process ID"). The UE may decode a corresponding physical downlink shared channel (PDSCH) indicated by the DCI, where the HARQ process identifier indicated by the DCI is associated with the PDSCH until data is successfully decoded or the HARQ process identifier is assigned to a new PDSCH. The UE may send HARQ information (e.g., an acknowledgment or negative acknowledgment (ACK/NACK)) to the network to indicate whether received data is successfully decoded. In case of a PDSCH decoding failure, PDSCH log likelihood ratios (LLRs) corresponding to the received data may be stored in memory (e.g., a HARQ buffer) allocated for the HARQ process identifier associated with the PDSCH to be soft-combined with the next PDSCH retransmission before attempting to decode the next PDSCH transmission. The ACK/NACK feedback may be provided in association with the HARQ process identifier. If NACK is detected by the network, the network may determine to retransmit the data to the UE using the same HARQ process identifier (which may be signaled to the UE by keeping the same new data indicator (NDI) bit polarity), or may abandon retransmission and transmit new data (with the new transmission indicated by a toggled DCI NDI bit).

In some examples of the techniques described herein, the network (e.g., one or more network entities or one or more base stations, among other examples) may transmit a last transmission indication for PDSCH grants or PUSCH grants. The last transmission indication may be signaled through DCI. For example, a dedicated DCI field may be transmitted to explicitly indicate the last transmission, a DCI order may be utilized to implicitly indicate the last transmission, or other information may be sent to indicate the last transmission. In some examples, the last transmission indication may indicate a last transmission (e.g., last packet of a retransmission) of a current data transmission to be communicated. In some approaches, the last transmission indication may allow a UE to improve a residual PDSCH block error ratio (BLER) by prioritizing handling of a last transmission. Additionally, or alternatively, the UE may increase memory (e.g., buffer) utilization efficiency by deleting data stored for retransmission. In some examples, the UE may reduce power consumption by skipping retransmission timers in connected mode discontinuous reception (C-DRX) without a forthcoming retransmission. In some scenarios, the UE may utilize the last transmission indication to determine whether received data corresponds to a retransmission or to a new transmission.

A method by a UE is described. The method may include receiving a downlink control message indicating a grant of channel resources for communication between the UE and a network entity, the downlink control message further indicating last transmission information corresponding to a last packet for a HARQ process associated with the grant of channel resources and processing data associated with the HARQ process based on the last transmission information.

A UE is described. The UE may include one or more memories storing processor executable code, and one or more processors coupled with the one or more memories. The one or more processors may individually or collectively operable to execute the code to cause the UE to receive a downlink control message indicating a grant of channel resources for communication between the UE and a network entity, the downlink control message further indicating last transmission information corresponding to a last packet for a HARQ process associated with the grant of channel resources and process data associated with the HARQ process based on the last transmission information.

Another UE is described. The UE may include means for receiving a downlink control message indicating a grant of channel resources for communication between the UE and a network entity, the downlink control message further indicating last transmission information corresponding to a last packet for a HARQ process associated with the grant of channel resources and means for processing data associated with the HARQ process based on the last transmission information.

A non-transitory computer-readable medium storing code is described. The code may include instructions executable by one or more processors to receive a downlink control message indicating a grant of channel resources for communication between the UE and a network entity, the downlink control message further indicating last transmission information corresponding to a last packet for a HARQ process associated with the grant of channel resources and process data associated with the HARQ process based on the last transmission information.

Some examples of the method, user equipment (UEs), and non-transitory computer-readable medium described herein may further include operations, features, means, or instructions for receiving the data associated with the HARQ process, where the last transmission information indicates that the data corresponds to the last packet, and where processing the data includes processing the data corresponding to the last packet using increased resources relative to resources allocated for processing non-last packet data.

In some examples of the method, user equipment (UEs), and non-transitory computer-readable medium described herein, the increased resources include increased resources for channel estimation, demodulation, decoding, or any combination thereof.

Some examples of the method, user equipment (UEs), and non-transitory computer-readable medium described herein may further include operations, features, means, or instructions for receiving the data associated with the HARQ process, where the last transmission information indicates that the data does not correspond to the last packet, and where processing the data includes refraining from decoding the data that does not correspond to the last packet based on a signal metric associated with the data failing to satisfy a signal quality criterion.

Some examples of the method, user equipment (UEs), and non-transitory computer-readable medium described herein may further include operations, features, means, or instructions for receiving the data associated with the HARQ process, where the last transmission information indicates that the data does not correspond to the last packet, and where processing the data includes decoding the data that does not correspond to the last packet based on a signal metric associated with the data satisfying a signal quality criterion.

In some examples of the method, user equipment (UEs), and non-transitory computer-readable medium described herein, processing the data may include operations, features, means, or instructions for deleting the data associated with the HARQ process or refraining from storing the data associated with the HARQ process based on the last transmission information indicating that the data corresponds to the last packet.

Some examples of the method, user equipment (UEs), and non-transitory computer-readable medium described herein may further include operations, features, means, or instructions for deallocating memory resources associated with the data based on the last transmission information indicating that the data corresponds to the last packet, where deallocating the memory resources may be performed in association with deleting the data or refraining from storing the data.

Some examples of the method, user equipment (UEs), and non-transitory computer-readable medium described herein may further include operations, features, means, or instructions for entering a sleep state and refraining from waking for a retransmission period associated with the data based on the last transmission information indicating that the data corresponds to the last packet.

Some examples of the method, user equipment (UEs), and non-transitory computer-readable medium described herein may further include operations, features, means, or instructions for refraining from allocating a retransmission timer based on the last transmission information indicating that the data corresponds to the last packet, where refraining from waking for the retransmission period may be based on refraining from allocating the retransmission timer.

In some examples of the method, user equipment (UEs), and non-transitory computer-readable medium described herein, processing the data may include operations, features, means, or instructions for processing the data associated with the HARQ process as a new transmission based on the last transmission information indicating that a previous packet was the last packet.

Some examples of the method, user equipment (UEs), and non-transitory computer-readable medium described herein may further include operations, features, means, or instructions for receiving a NDI associated with the data, the NDI indicating that the data corresponds to the previous packet and determining that the data corresponds to the new transmission regardless of the NDI based on the last transmission information indicating that the previous packet was the last packet, where processing the data as the new transmission may be performed based on the determination.

A method by a network entity is described. The method may include outputting a downlink control message indicating a grant of channel resources for communication between the network entity and a UE, the downlink control message further indicating last transmission information corresponding to a last packet for a HARQ process associated with the grant of channel resources and outputting data associated with the HARQ process based on the last transmission information.

A network entity is described. The network entity may include one or more memories storing processor executable code, and one or more processors coupled with the one or more memories. The one or more processors may individually or collectively operable to execute the code to cause the network entity to output a downlink control message indicating a grant of channel resources for communication between the network entity and a UE, the downlink control message further indicating last transmission information corresponding to a last packet for a HARQ process associated with the grant of channel resources and output data associated with the HARQ process based on the last transmission information.

Another network entity is described. The network entity may include means for outputting a downlink control message indicating a grant of channel resources for communication between the network entity and a UE, the downlink control message further indicating last transmission information corresponding to a last packet for a HARQ process associated with the grant of channel resources and means for outputting data associated with the HARQ process based on the last transmission information.

A non-transitory computer-readable medium storing code is described. The code may include instructions executable by one or more processors to output a downlink control message indicating a grant of channel resources for communication between the network entity and a UE, the downlink control message further indicating last transmission information corresponding to a last packet for a HARQ process associated with the grant of channel resources and output data associated with the HARQ process based on the last transmission information.

In some examples of the method, network entities, and non-transitory computer-readable medium described herein, the last transmission information indicates that the data corresponds to the last packet.

Some examples of the method, network entities, and non-transitory computer-readable medium described herein may further include operations, features, means, or instructions for outputting a retransmission of the data associated with the HARQ process, where the last transmission information indicates that the data does not correspond to the last packet.

Some examples of the method, network entities, and non-transitory computer-readable medium described herein may further include operations, features, means, or instructions for refraining from outputting a retransmission of the data in a retransmission period associated with the data based on the last transmission information indicating that the data corresponds to the last packet.

Some examples of the method, network entities, and non-transitory computer-readable medium described herein may further include operations, features, means, or instructions for refraining from allocating a retransmission timer based on the last transmission information indicating that the data corresponds to the last packet, where refraining from outputting the retransmission of the data may be based on refraining from allocating the retransmission timer.

In some examples of the method, network entities, and non-transitory computer-readable medium described herein, outputting the data may include operations, features, means, or instructions for outputting the data associated with the HARQ process as a new transmission based on the last transmission information indicating that a previous packet was the last packet.

BRIEF DESCRIPTION OF THE DRAWINGS

FIG. 3 shows timing diagrams illustrating an example of a first connected mode discontinuous reception (C-DRX) scenario and an example of a second C-DRX scenario that support last transmission indications in accordance with one or more aspects of the present disclosure.

FIGS. 14 through 17 show flowcharts illustrating methods that support last transmission indications in accordance with one or more aspects of the present disclosure.

DETAILED DESCRIPTION

Figure 1:
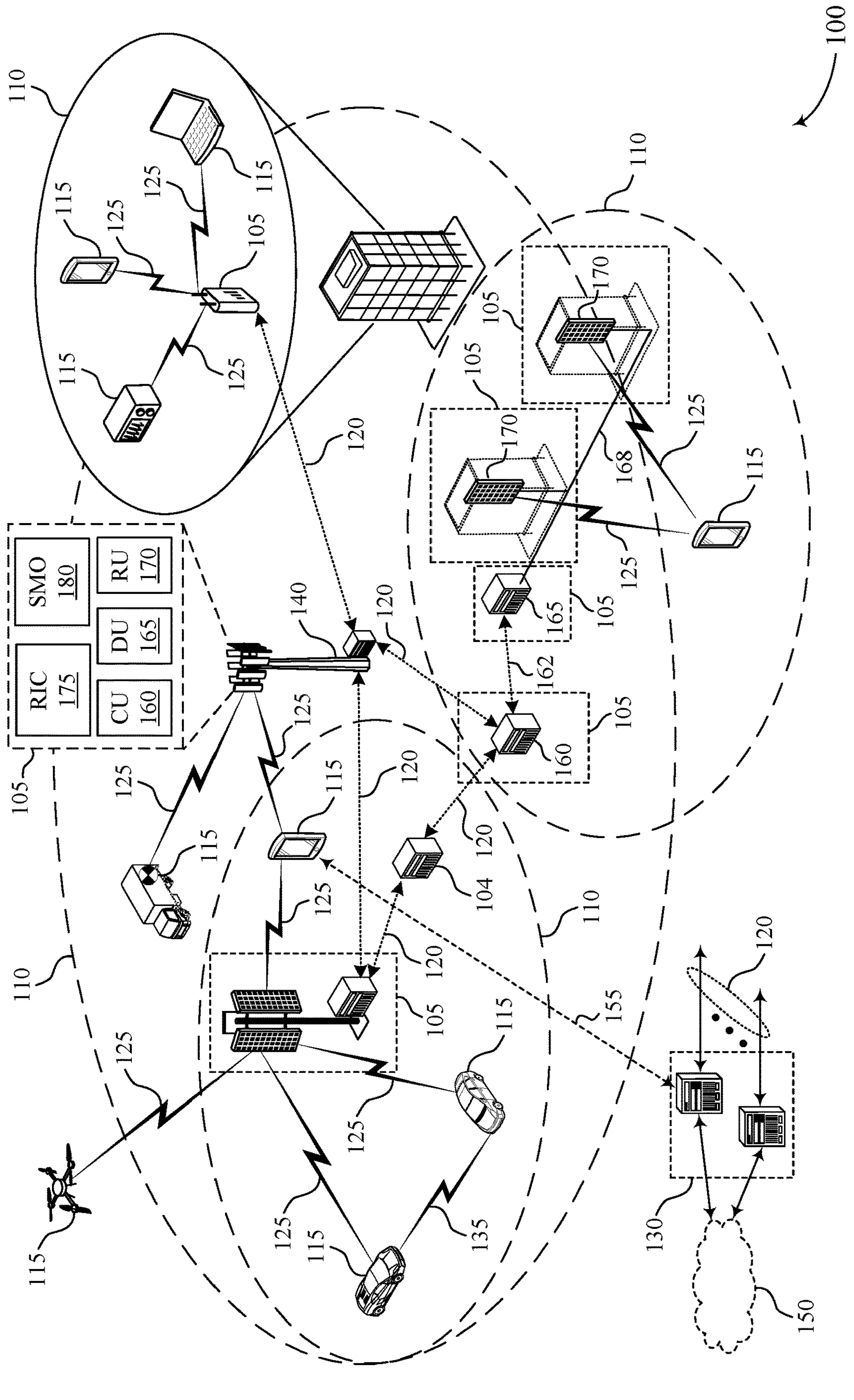
FIG. 1 shows an example of a wireless communications system that supports last transmission indications in accordance with one or more aspects of the present disclosure.

Some wireless communication systems utilize hybrid automatic repeat request (HARQ) techniques for retransmission of data. When decoding fails for a packet of data, the data may be retransmitted in accordance with HARQ techniques to provide increased communication reliability. For example, a user equipment (UE) may receive a physical downlink control channel (PDCCH) with downlink control information (DCI) indicating a HARQ process identifier (e.g., "HARQ process ID"). The UE may decode a corresponding physical downlink shared channel (PDSCH) indicated by the DCI, where the HARQ process identifier indicated by the DCI is associated with the PDSCH until data is successfully decoded or the HARQ process identifier is assigned to a new PDSCH. The UE may send HARQ information (e.g., an acknowledgment or negative acknowledgment (ACK/NACK)) to the network to indicate whether received data is successfully decoded. In case of a PDSCH decoding failure, PDSCH log likelihood ratios (LLRs) corresponding to the received data may be stored in memory (e.g., HARQ buffer) allocated for the HARQ process identifier associated with the PDSCH to be soft-combined with the next PDSCH retransmission before attempting to decode the next PDSCH transmission. The ACK/NACK feedback may be provided in association with the HARQ process identifier. If NACK is detected by the network, the network may determine to retransmit the data to the UE using the same HARQ process identifier (which may be signaled to the UE by keeping the same new data indicator (NDI) bit polarity), or may abandon retransmission and transmit new data (with the new transmission indicated by a toggled DCI NDI bit). In a case that retransmission is abandoned, the UE may maintain the stored LLRs in memory until new data is indicated. Maintaining the stored LLRs may waste limited memory resources when no retransmission is forthcoming.

In some uplink retransmission techniques, a physical uplink shared channel (PUSCH) retransmission may be scheduled by a PDCCH scrambled by a cell radio network temporary identifier (C-RNTI), with the same HARQ process identifier and same NDI polarity. The UE may continue transmitting uplink (e.g., PUSCH) data until the NDI associated with the HARQ process identifier is toggled. Until the NDI is toggled or until the HARQ process identifier is not assigned to a new PUSCH, the uplink data may be stored in memory for retransmission. In a case that further retransmission is not performed, storing the uplink data may waste memory resources.

Connected mode discontinuous reception (C-DRX) may reduce UE power consumption by allowing the UE to enter a sleep state in a low activity period. In some approaches, the UE or the network may maintain a retransmission timer (e.g., drx-RetransmissionTimerDL or drx-Retransmission-TimerUL). When the retransmission timer is running, the UE may enter an active or awake state to allow downlink or uplink retransmissions. In a case that no retransmission is forthcoming, entering the active state or maintaining the retransmission timer may waste resources (e.g., power resources).

In some examples of the techniques described herein, the network (e.g., one or more network entities or one or more base stations, among other examples) may transmit a last transmission indication for PDSCH grants or PUSCH grants. The last transmission indication may be signaled through DCI. For example, a dedicated DCI field may be transmitted to explicitly indicate the last transmission, a DCI order may be utilized to implicitly indicate the last transmission, or other information may be sent to indicate the last transmission. In some examples, the last transmission indication may indicate a last transmission (e.g., last packet of a retransmission) of a current data transmission to be communicated. In some approaches, the last transmission indication may allow a UE to improve a residual PDSCH block error ratio (BLER) by prioritizing handling of a last transmission. Additionally, or alternatively, the UE may increase memory (e.g., buffer) utilization efficiency by deleting data stored for retransmission. In some examples, the UE may reduce power consumption by skipping retransmission timers in C-DRX without a forthcoming retransmission. In some scenarios, the UE may utilize the last transmission indication to determine whether received data corresponds to a retransmission or to a new transmission.

Aspects of the disclosure are initially described in the context of wireless communications systems. Aspects of the disclosure are additionally illustrated by and described with reference to timing diagrams. Aspects of the disclosure are also illustrated by and described with reference to process flow diagrams. Aspects of the disclosure are further illustrated by and described with reference to apparatus diagrams, system diagrams, and flowcharts that relate to last transmission indications.

FIG. 1 shows an example of a wireless communications system 100 that supports last transmission indications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes

104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support last transmission indications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. HARQ feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Some wireless communication systems utilize HARQ techniques for retransmission of data. When decoding fails for a packet of data, the data may be retransmitted in accordance with HARQ techniques to provide increased communication reliability. For example, the UE 115 may receive a PDCCH with DCI indicating a HARQ process identifier. In some examples, the UE 115 may support up to a quantity (e.g., 16) downlink HARQ processes subject to UE 115 capability (e.g., some UEs 115 may support more or fewer downlink HARQ processes). In some cases, a quantity of (e.g., up to 32, more, or fewer) HARQ processes may be supported per cell. The actual quantity of processes may be configured by a network entity 105 to the UE 115 via one or more parameters (e.g., one or more parameters at a higher level than the physical level) signaled to the UE 115.

After detecting a PDCCH with a configured DCI format (e.g., format 1_0, 1_1, 4_0, 4_1, 4_2, or 1_2), the UE 115 may decode a corresponding PDSCH indicated by the DCI, where the HARQ process identifier indicated by the DCI is associated with the PDSCH until data may be successfully decoded or the HARQ process identifier may be assigned to a new PDSCH. The UE 115 may send HARQ information (e.g., an ACK/NACK) to the network (e.g., network entity 105) to indicate whether received data is successfully decoded. The ACK/NACK feedback may be provided in association with the HARQ process identifier. For example, a network entity 105 may transmit a PDSCH (e.g., PDSCH #1 with a HARQ process ID #0 and a redundancy version (RV) #0) to the UE 115. In a case that the PDSCH is decoded on the first transmission, the UE 115 may transmit an ACK (with HARQ process ID #0) to the network entity 105.

In case of a PDSCH decoding failure, PDSCH LLRs corresponding to the received data may be stored in memory (e.g., HARQ buffer) allocated for the HARQ process identifier associated with the PDSCH to be soft-combined with the next PDSCH retransmission before attempting to decode the next PDSCH transmission. An example of a PDSCH that is decoded after one retransmission is given as follows. A network entity 105 may transmit a PDSCH (e.g., PDSCH #1 with a HARQ process ID #0 and RV #0). The UE 115 may fail to decode the PDSCH and may store HARQ data (e.g., HARQ LLRs). The UE 115 may transmit a NACK (e.g., a NACK with HARQ process ID #0) to the network entity 105. The network entity 105 may retransmit the PDSCH (e.g., PDSCH #1 with HARQ processor ID #0 and RV #1). The UE 115 may receive the retransmitted PDSCH and may combine the stored HARQ data (e.g., LLRs corresponding to PUSCH #0 and RV #0) with the received retransmitted data (e.g., LLRs corresponding to PUSCH #1 and RV #1). In some cases, combining the stored data and the retransmitted data may allow the UE 115 to successfully decode the PDSCH. After successfully decoding, the UE 115 may transmit an ACK (e.g., ACK with HARQ process ID #0) to the network entity 105.

If NACK is detected by the network (e.g., network entity 105), the network may determine to retransmit the data to the UE 115 using the same HARQ process identifier (which may be signaled to the UE 115 by keeping the same NDI bit polarity), or may abandon retransmission and transmit new data (with the new transmission indicated by a toggled DCI NDI bit). In a case that retransmission is abandoned, the UE 115 may maintain the stored LLRs in memory until new data is indicated. Similar to the previous example where the PDSCH decode fails and the UE 115 transmits a NACK to the network entity 105, if the network entity 105 does not retransmit the same PDSCH (e.g., determines to discard the PDSCH), the network entity 105 may use the HARQ process ID (e.g., HARQ process ID #0) to transmit a new PDSCH (e.g., PDSCH #2 with HARQ process ID #0 and RV #0). In this case, the UE 115 may store HARQ data (e.g., HARQ LLRs), which may not be used for soft combining. Maintaining the stored LLRs may waste limited memory resources when no retransmission is forthcoming.

In some uplink retransmission techniques, a PUSCH retransmission may be scheduled by a PDCCH scrambled by a C-RNTI, with the same HARQ process identifier and same NDI polarity. The UE 115 may continue transmitting uplink (e.g., PUSCH) data until the NDI associated with the HARQ process identifier is toggled. Until the NDI is toggled or until the HARQ process identifier is not assigned to a new PUSCH, the uplink data may be stored in memory (e.g., a buffer) for retransmission. For example, the network entity 105 may transmit a grant (e.g., direct or configured grant) to the UE 115 scheduling a PUSCH (e.g., PUSCH #1 with HARQ process ID #0). The UE 115 may transmit the PUSCH (e.g., PUSCH #1 with HARQ process ID #0 and RV #0) to the network entity 105 and may store the uplink data in memory for a retransmission. In a case that decoding the PUSCH fails at the network entity 105, the network entity 105 may transmit a request to the UE 115 to retransmit the PUSCH (e.g., PUSCH #1 with HARQ process ID #0) scheduled via a PDCCH with CRC scrambled with CS-RNTI. The UE 115 may retransmit the PUSCH (e.g., PUSCH with HARQ process ID #0 and RV #1) to the network entity 105. In some cases, decoding the retransmitting PUSCH may succeed or fail at the network entity 105. The network entity 105 may successfully decode the PUSCH or may abandon requesting further retransmission from the UE 115. In a case that further retransmission is not performed, storing the uplink data may waste memory resources.

At the time of PDSCH or PUSCH grant handling, the UE 115 may operate in accordance with some approaches described herein, where the network entity 105 schedules a HARQ retransmission in a case of CRC failure or unsuccessful PUCCH (e.g., ACK/NACK feedback) decoding. To handle a scheduled retransmission, for instance, the UE 115 may offload downlink HARQ data to memory and store the HARQ data until the HARQ process identifier is not assigned to a new PDSCH, or may store uplink data in the memory until the HARQ process identifier is not assigned to a new PUSCH. In some approaches, the memory allocated for the HARQ process may be deallocated after receiving the new PDSCH grant that uses the same HARQ process. Keeping the memory occupied in cases where no further retransmission will occur may reduce memory availability or consume power to maintain the data in memory.

C-DRX may reduce UE 115 power consumption by allowing the UE 115 to enter a sleep state in a low activity period. To monitor the PDCCH, the UE 115 may activate (e.g., "wake up") periodically and remain active (e.g., "awake") for an amount of time before starting the next inactive (e.g., "sleep") cycle. One or more parameters (e.g., drx-SlotOffset, drx-OnDurationTimer, drx-ShortCycle, drx-ShortCycleTimer, or drx-LongCycleSlotOffset RRC parameters) may establish the duration and start of C-DRX On and Off cycles. In some approaches, the drx-InactivityTimer may establish a time (e.g., minimum time) that the UE 115 remains in the On state after being scheduled by the network. For C-DRX and retransmission handling, for example, the UE 115 or the network (e.g., network entity 105) may maintain a retransmission timer (e.g., drx-RetransmissionTimerDL or drx-RetransmissionTimerUL). When the retransmission timer is running, the UE 115 may enter an active or awake state to allow downlink or uplink retransmissions.

In a case of PDSCH or PUSCH CRC failure, the network entity 105 may schedule a retransmission when the UE 115 has started an Off cycle. The UE 115 may wait for a period after a transmission (e.g., a round trip time (RTT)) for retransmission to be scheduled by the network entity 105. For instance, the RRC parameters drx-HARQ-RTT-TimerDL or drx-HARQ-RTT-TimerUL may establish, in a quantity of symbols, a period after the current transmission that a retransmission may be scheduled by the network entity 105. The UE 115 may be inactive during part of all of the period (indicated by drx-HARQ-RTT-TimerDL or drx-HARQ-RTT-TimerUL, for instance). In some examples, a parameter may establish a period for the UE 115 to be active, in which retransmission may be scheduled. For example, the drx-Retransmission TimerDL or drx-RetransmissionTimerUL may establish a quantity of slots that the UE 115 is to stay awake waiting for the network entity 105 to schedule retransmission. In other words, in C-DRX mode the UE 115 may remain awake during the period when the network entity 105 may schedule PDSCH or PUSCH HARQ retransmission. In a case that no retransmission is forthcoming, entering the active state or maintaining the retransmission timer may waste resources (e.g., power resources).

In some approaches, the UE 115 may handle all PDSCH HARQ transmission iterations with the same priority. The UE 115 may not have information regarding a quantity of retransmissions budgeted by the network for the PDSCH grant. Accordingly, first and last retransmissions may be handled the same, and the UE 115 may not prioritize the last HARQ transmission to improve block error ratio (BLER) metrics.

In some examples of the techniques described herein, the network (e.g., one or more network entities 105 or one or more base stations, among other examples) may transmit a last transmission indication for PDSCH grants or PUSCH grants. The last transmission indication may be signaled through DCI. For example, a dedicated DCI field may be transmitted to explicitly indicate the last transmission, a DCI order may be utilized to implicitly indicate the last transmission, or other information may be sent to indicate the last transmission. In some examples, the last transmission indication may indicate a last transmission (e.g., last packet of a retransmission) of a current data transmission to be communicated. In some approaches, the last transmission indication may allow a UE 115 to improve a residual PDSCH BLER by prioritizing handling of a last transmission. Additionally, or alternatively, the UE 115 may increase memory utilization efficiency by deleting data stored for retransmission. In some examples, the UE 115 may reduce power consumption by skipping retransmission timers in C-DRX without a forthcoming retransmission. In some scenarios, the UE 115 may utilize the last transmission indication to determine whether received data corresponds to a retransmission or to a new transmission.

Figure 2:
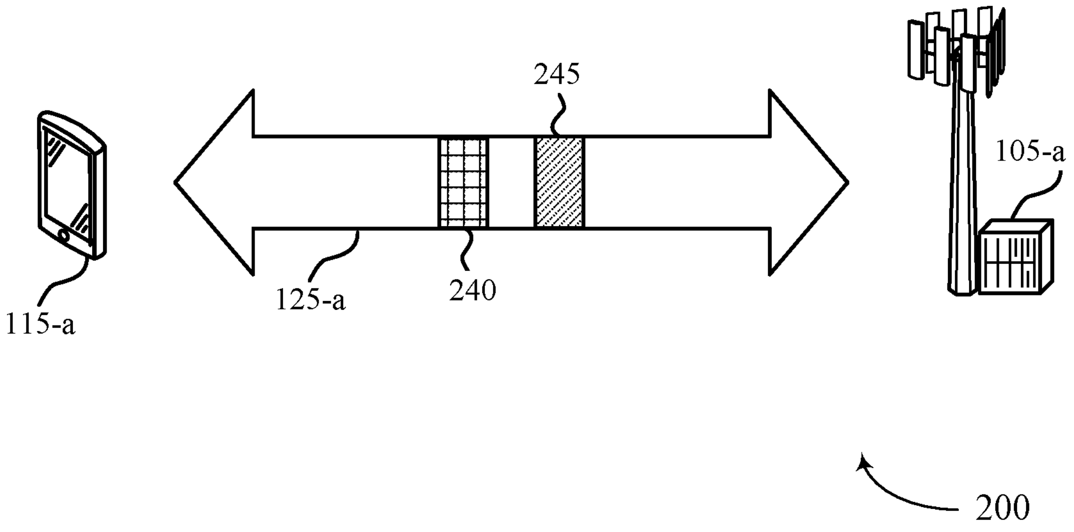
FIG. 2 shows an example of a wireless communications system that supports last transmission indications in accordance with one or more aspects of the present disclosure.

FIG. 2 shows an example of a wireless communications system 200 that supports last transmission indications in accordance with one or more aspects of the present disclosure. The wireless communications system 200 may implement aspects of or may be implemented by aspects of the wireless communications system 100. For instance, the wireless communications system 200 may include a UE 115-*a* and a network entity 105-*a*. In some aspects, the UE

115-*a* may be an example of a UE 115 as described with respect to FIG. 1. In some aspects, the network entity 105-*a* may be an example of a network entity 105 as described with respect to FIG. 1.

The UE 115-*a* may communicate with the network entity 105-*a* using a communication link 125-*a*, which may be an example of a communication link 125 described with respect to FIG. 1. The communication link 125-*a* may include a bi-directional link that enables both uplink and downlink network communications. For example, the UE 115-*a* may transmit one or more transmissions (e.g., uplink or downlink control signals or data signals), to the network entity 105-*a* using the communication link 125-*a*, and the network entity 105-*a* may transmit one or more transmissions (e.g., downlink or uplink control signals or data signals), to the UE 115-*a* using the communication link 125-*a*. In some examples, the communication link 125-*a* may include, may carry, or may be implemented via one or more channels (e.g., PDCCH, PDSCH, or PUSCH, among other examples).

The network entity 105-*a* may output (e.g., transmit) a downlink control message 240 indicating a grant of channel resources for communication between the network entity 105-*a* and the UE 115-*a*. For example, the downlink control message 240 (e.g., DCI) may indicate a PDSCH grant for a transmission from the network entity 105-*a* to the UE 115-*a*, or may indicate a PUSCH grant for a transmission from the UE 115-*a* to the network entity 105-*a*.

The downlink control message 240 may indicate last transmission information corresponding to a last packet for a HARQ process associated with the grant of channel resources. For example, the last transmission information may indicate or identify a last packet for a HARQ process associated with a PDSCH or a PUSCH. In some examples, the last transmission information may indicate an index of a last packet, a timing of a last packet, a slot or subslot for a last packet, a time or frequency resource allocated for the last packet, a quantity of packets, a quantity of transmissions, or a quantity of retransmissions associated with a HARQ process (e.g., HARQ process identifier). A last packet may refer to a last packet of a set of data, a payload, a file, a communication session, an allocated channel (e.g., PDSCH or PUSCH), HARQ process identifier, or other set of data. One or more additional transmissions (e.g., payload transmissions, files, sessions, channels, HARQ processes, among other examples) may occur after a last packet.

In some approaches, the downlink control message 240 (e.g., DCI) may include a field to indicate the last transmission information. For instance, a bit or bits of the DCI may explicitly indicate the last transmission information (e.g., last packet). Additionally, or alternatively, the downlink control message 240 may be arranged to indicate the last transmission information (e.g., the DCI may be ordered to implicitly indicate the last transmission information). For instance, the downlink control message 240 may include one or more bits or fields ordered to indicate the last transmission information (e.g., last packet).

The UE 115-*a* may receive the downlink control message 240. For example, the UE 115-*a* may receive the downlink control message 240 indicating the grant of channel resources for communication between the UE 115-*a* and the network entity 105-*a*, where the downlink control message 240 indicates last transmission information corresponding to the last packet for the HARQ process associated with the grant of channel resources. In some examples, the UE 115-*a* may determine the last packet based on the downlink control message 240. For instance, the UE 115-*a* may process (e.g., read) a field of the DCI to determine the last packet for the HARQ process. Additionally, or alternatively, the UE 115-*a* may interpret a DCI order (e.g., bit order or field order) to determine the last packet for the HARQ process.

In some examples, the UE 115-*a* or the network entity 105-*a* may communicate data 245. For example, the UE 115-*a* may transmit the data 245 to the network entity 105-*a* or the network entity 105-*a* may transmit the data 245 to the UE 115-*a* in association with a HARQ process. The data 245 may be a transmission, retransmission, a packet, a last packet, a non-last packet, an ACK, a NACK, or a request for retransmission.

In some examples, the network entity 105-*a* may output (e.g., transmit) the data 245 associated with the HARQ process based on the last transmission information. For instance, the network entity 105-*a* may send one or more retransmissions (e.g., packets) up to the last packet. In some aspects, the network entity 105-*a* may send a quantity of PDSCH packets until the last packet in response to one or more NACKs received from the UE 115-*a* in accordance with the last transmission information. Additionally, or alternatively, the network entity 105-*a* may request one or more retransmissions (e.g., packets) up to the last packet. For instance, the network entity 105-*a* may send one or more requests for a quantity of PUSCH packets until the last packet in response to one or more PUSCH decode failures at the network entity 105-*a*.

The UE 115-*a* may process data associated with the HARQ process based on the last transmission information. For instance, processing data associated with the HARQ process may include increasing resources for receiving the last packet, dropping a packet (e.g., refraining from decoding a packet) that is not the last packet, storing the data or a derivative of the data, deleting the data or a derivative of the data, allocating memory for the data, deallocating memory for the data, or receiving a transmission as a new transmission, among other examples.

In some approaches, the last transmission information indicates that the data corresponds to the last packet. The UE 115-*a* may receive the data associated with the HARQ process (e.g., receive a retransmission associated with the HARQ process), where the last transmission information indicates that the data corresponds to the last packet. The UE 115-*a* may process the data corresponding to the last packet using increased resources relative to resources allocated for processing non-last packet data. In some examples, the increased resources may include increased resources for channel estimation, demodulation, or decoding. For instance, providing the UE 115-*a* with the last transmission information (e.g., iteration notification) may allow the UE 115-*a* to allocate more hardware or program resources for the last packet, such as using an enhanced channel estimation algorithm, an enhanced demodulation algorithm, or budgeting increased low density parity check (LDPC) iterations per code block, among other examples. Using increased resources for the last packet may reduce residual BLER (e.g., PDSCH BLER) for the last HARQ combining transmission. The enhanced BLER may come at the expense of increased power consumption relative to other packets. An example of processing last packet data with increased resources is given with reference to FIG. 5.

In some examples, the network entity 105-*a* may output a retransmission of the data associated with the HARQ process, where the last transmission information indicates that the data does not correspond to the last packet. In some approaches, the UE 115-*a* may receiving data associated with the HARQ process, where the last transmission information indicates that the data does not correspond to the last packet. In some cases, the UE 115-*a* may refrain from decoding the data that does not correspond to the last packet. For instance, the UE 115-*a* may determine or receive a signal metric (e.g., signal to noise ratio (SNR), signal to interference noise ratio (SINR), channel quality information (CQI), reference signal received power (RSRP), reference signal received quality (RSRQ), or signal strength, among other examples) associated with the data. The UE 115-*a* may determine whether the signal metric satisfies a signal quality criterion. The signal quality criterion may be a threshold quantity for the signal metric. The UE 115-*a* may refrain from decoding the data that does not correspond to the last packet based on the signal metric associated with the data failing to satisfy a signal quality criterion (e.g., if the signal metric does not satisfy a threshold). For instance, if UE 115-*a* estimates a relatively low quality of the received PDSCH signal when an additional retransmission may be sent, the UE 115-*a* may determine to skip PDSCH decoding and wait for the next retransmission. Accordingly, the UE 115-*a* may skip a current transmission (or retransmission) when a subsequent retransmission may occur (due to the current transmission corresponding to a non-last packet, for example). An example of refraining from decoding non-last packet data is given with reference to FIG. 5.

In some cases, the UE 115-*a* may receive the data associated with the HARQ process, where the last transmission information indicates that the data does not correspond to the last packet. The UE 115-*a* may decode the data that does not correspond to the last packet based on a signal metric associated with the data satisfying a signal quality criterion. For instance, if the signal metric satisfies the signal quality criterion, the UE 115-*a* may decode the non-last packet data.

In some examples, processing the data may include deleting the data associated with the HARQ process or refraining from storing the data associated with the HARQ process based on the last transmission information indicating that the data corresponds to the last packet. In some approaches without an indication of last transmission information, a UE may store a PUSCH transport block or CRC-failed HARQ data in memory.

In accordance with some of the techniques described herein, the UE 115-*a* may refrain from storing data associated with the HARQ process. For example, the UE 115-*a* may not store uplink (e.g., PUSCH) data of a last packet (e.g., last transmitted packet) to memory (e.g., a buffer) because no retransmission or request for retransmission may occur after the last packet. In another example, the UE 115-*a* may not store HARQ data (e.g., LLRs) from decoding a last packet (e.g., last received packet) because no subsequent soft combining of the data may occur after the last packet.

Additionally, or alternatively, the UE 115-*a* may delete (e.g., remove, set as available or writable memory space, among other examples) data associated with the HARQ process. For non-last packet data associated with a HARQ process, for example, the UE 115-*a* may store LLRs (from data decoding) in memory for soft combining with subsequently retransmitted data. After last packet data (e.g., downlink data) is received and the previously stored LLRs are utilized for soft combining, the UE 115-*a* may delete the stored LLRs because no further retransmission associated with the HARQ process may occur after the last packet. For uplink transmissions, after a last packet is transmitted, the UE 115-*a* may delete data associated with the HARQ process that was previously held in memory for a non-last packet retransmission. In some examples of the techniques described herein, "memory" may refer to modem memory, one or more buffers (e.g., HARQ buffer(s)), main memory (e.g., application memory), random access memory (RAM), or any combination thereof.

In some examples, the UE 115-*a* may deallocate memory resources associated with the data based on the last transmission information indicating that the data corresponds to the last packet. Deallocating the memory resources may be performed in association with deleting the data or refraining from storing the data.

Some examples of the techniques described herein may enhance UE 115-*a* memory utilization and power savings. Providing the UE 115-*a* with the last transmission iteration notification may allow relatively earlier eviction of PUSCH and PDSCH HARQ data (than in approaches where the last transmission information is not provided), which may enhance UE 115-*a* memory allocation, which may result in reduced UE 115-*a* memory consumption and lower power consumption. Additionally, or alternatively, skipping HARQ data transfers to memory may help to reduce power consumed by modem hardware. Examples of refraining from storing data or deleting data are given with reference to FIG. 4 and FIG. 5.

In some examples, the UE 115-*a* may enter a sleep state and may refrain from waking for a retransmission period associated with the data based on the last transmission information indicating that the data corresponds to the last packet. In C-DRX, for example, after a last packet is transmitted or received, the UE 115-*a* may enter a sleep state and may not activate or wake up for a retransmission period associated with the data. In some aspects, the UE 115-*a* may refrain from allocating a retransmission timer based on the last transmission information indicating that the data corresponds to the last packet. Refraining from waking for the retransmission period may be based on refraining from allocating the retransmission timer.

In some examples, the network entity 105-*a* may refrain from outputting a retransmission of the data in a retransmission period associated with the data based on the last transmission information indicating that the data corresponds to the last packet. In C-DRX, for instance, the network entity 105-*a* may not retransmit data in the retransmission period associated with the last packet. In some aspects, the network entity 105-*a* may refrain from allocating a retransmission timer based on the last transmission information indicating that the data corresponds to the last packet. Refraining from outputting the retransmission of the data may be based on refraining from allocating the retransmission timer. Examples of refraining from waking and retransmitting in a retransmission period in the context of C-DRX are given with reference to FIG. 3.

Some scenarios may occur where data associated with a HARQ process may correspond to a new transmission (e.g., new set of data). For instance, the NDI bit may fail to indicate when a PDSCH corresponding to a HARQ process identifier actually includes new data (and not a retransmission of previous data). For example, scenarios may occur where a network entity (in a cellular network, for instance) schedules a UE with downlink grants without retransmission, which may occur for latency-sensitive data (e.g., voice, video calling, or some streaming services, among other examples). Latency-sensitive data may not be retransmitted in a case of CRC failure in some approaches.

In an example, a UE may receive a first downlink grant (e.g., a first downlink grant for PDSCH #1 with a HARQ process ID #0 and RV #0). The UE may receive and decode a first PDSCH (e.g., PDSCH #1) successfully, and may send an ACK to a network entity. Without the last transmission indication, the UE may operate in an approach where the network entity may not be able to receive ACK information. In that case, the ACK may be processed as a NACK. Accordingly, the UE may operate with an approach where a new retransmission of the decoded PDSCH may be received. For example, the UE may store HARQ data (e.g., LLRs) associated with the first downlink grant.

In some cases, the UE may fail to decode a second PDSCH (e.g., PDSCH #2) from a second downlink grant (e.g., second downlink grant via PDCCH) sent by the network entity for the same HARQ process identifier. For instance, the network entity may send a second PDSCH (e.g., PDSCH #2 with HARQ process ID #0 and RV #0), which the UE may fail to decode. The decoding failure may occur for various reasons, such as a relatively poor channel condition or a receive processing gap, among other examples.

In this example, the network entity may sends a new grant (for PDSCH #3) for the same HARQ process identifier (e.g., PDSCH #3 with HARQ process ID #0 and RV #0). The NDI bit has now been toggled or flipped twice (for grant #2 and #3), so the UE may have no information to determine whether PDSCH #3 is a new grant or a retransmission of PDSCH #1. In this case, the UE may combine the HARQ data of PDSCH #1 with the new data of PDSCH #3, which may cause a decode failure.

In accordance with some of the techniques described herein, the last transmission information may help to resolve some of the foregoing scenarios where an ambiguity exists regarding whether a transmission is a new transmission or a retransmission. For example, having the last transmission information may allow the UE 115-*a* to discard the HARQ data corresponding to the first PDSCH and handle the third PDSCH in the foregoing example as a new transmission.

In some examples, the network entity 105-*a* may output (e.g., transmit) the data associated with the HARQ process as a new transmission based on the last transmission information indicating that a previous packet was the last packet. For instance, after a last packet is transmitted, a subsequent packet may be transmitted as a new transmission.

In some aspects, the UE 115-*a* may process the data associated with the HARQ process as a new transmission based on the last transmission information indicating that a previous packet was the last packet. For example, the UE 115-*a* may receive an NDI associated with the data, where the NDI indicates that the data corresponds to the previous packet. The UE 115-*a* may determine that the data corresponds to the new transmission regardless of the NDI based on the last transmission information indicating that the previous packet was the last packet. Processing the data as the new transmission may be performed based on the determination. For instance, in a case where the NDI of a packet has a same value as an NDI of a previous packet that was indicated as the last packet, the UE 115-*a* may determine that the packet corresponds to a new transmission and may refrain from combining the new transmission with HARQ data (e.g., LLRs) corresponding to the previous packet.

In some examples, having the last transmission indication for a downlink grant or an uplink grant may reduce UE power consumption, may reduce a residual PDSCH BLER, or may achieve enhanced UE memory utilization. For instance, the UE 115-*a* or the network entity 105-*a* may utilize the last transmission information to skip one or more actions, reduce power consumption, or prioritize the decoding of a last PDSCH transmission.

FIG. 3 shows an example of a first C-DRX scenario 300-*a* and an example of a second C-DRX scenario 300-*b* that support last transmission indications in accordance with one or more aspects of the present disclosure. The wireless communications system 100 or the wireless communications system 200 may operate in accordance with one or more aspects of the first C-DRX scenario 300-*a* or the second C-DRX scenario 300-*b* in some approaches. For example, a UE 115 or a network entity 105 described with reference to FIG. 1 or the UE 115-*a* or the network entity 105-*a* described with reference to FIG. 2 may operate in accordance with one or more aspects of the first C-DRX scenario 300-*a* or the second C-DRX scenario 300-*b*.

The first C-DRX scenario 300-*a* is illustrated with respect to time 318. The first C-DRX scenario 300-*a* is a scenario where a UE is in an active (e.g., awake or On) state for an active duration 302 (e.g., a duration indicated by a drx-OnDurationTimer) and an inactivity duration 304 (e.g., a duration indicated by a drx-InactivityTimer). In the example of the first C-DRX scenario 300-*a*, the UE receives a PDSCH 308 (from a network entity) during the active duration 302 and remains in the active state for the inactivity duration 304. During the inactivity duration 304, the UE transmits a NACK 310. For example, the UE may transmit the NACK 310 to a network entity in response to a decode failure of the PDSCH 308.

In a case that the PDSCH 308 is a non-last packet in accordance with the last transmission information, the UE may allocate a round trip timer 314 (e.g., drx-HARQ-RTT-TimerDL) and may allocate a retransmission timer 316 (e.g., drx-RetransmissionTimerDL) to receive a retransmission during a retransmission period 312. The UE may enter an inactive state after the inactivity duration 304 and during the round trip timer 314. When the round trip timer 314 expires, the UE may enter the active state (e.g., may "wake") for the transmission period 312 during the retransmission timer 316. For example, the UE may be active during the retransmission timer 316, waiting for a downlink retransmission to be scheduled by the network entity.

In a case that the PDSCH 308 corresponds to a last packet in accordance with the last transmission information, the UE may refrain from allocating the retransmission timer 316 or may refrain from waking for the retransmission period 312 as described with reference to FIG. 2. The last transmission information may allow the UE to skip utilizing the retransmission timer 316 (e.g., drx-RetransmissionTimerDL) before entering the inactive (e.g., sleep) state, which may enable the UE to remain in the inactive state during the retransmission period 312 because no retransmission may occur after the last packet (e.g., PDSCH 308) is received. Accordingly, the UE may remain in the inactive state for a longer inactive duration 306, which may result in power savings. Without the last transmission information, for instance, a UE may enter the active state to receive a retransmission in some cases where no retransmission may be scheduled or occur, which may waste power.

The second C-DRX scenario 300-*b* is illustrated with respect to time 338. The second C-DRX scenario 300-*b* is a scenario where a UE is in an active (e.g., awake or On) state for an active duration 322 (e.g., a duration indicated by a drx-OnDurationTimer). In the example of the second C-DRX scenario 300-*b*, the UE transmits a PUSCH 330 (to a network entity) during the active duration 322.

In a case that the PUSCH 330 is a non-last packet in accordance with the last transmission information, the UE may allocate a round trip timer 334 (e.g., drx-HARQ-RTT-TimerUL) and may allocate a retransmission timer 336 (e.g., drx-RetransmissionTimerUL) to transmit a retransmission during a retransmission period 332. The UE may enter an inactive state after the active duration 322 and during the round trip timer 334. When the round trip timer 334 expires, the UE may enter the active state (e.g., may "wake") for the transmission period 332 during the retransmission timer 336. For example, the UE may be active during the retransmission timer 336, waiting for an uplink retransmission to be scheduled by the network entity.

In a case that the PUSCH 330 corresponds to a last packet in accordance with the last transmission information, the UE may refrain from allocating the retransmission timer 336 or may refrain from waking for the retransmission period 332 as described with reference to FIG. 2. The last transmission information may allow the UE to skip utilizing the retransmission timer 336 (e.g., drx-RetransmissionTimerUL) before entering the inactive (e.g., sleep) state, which may enable the UE to remain in the inactive state during the retransmission period 332 because no retransmission may occur after the last packet (e.g., PUSCH 330) is transmitted. Accordingly, the UE may remain in the inactive state for a longer inactive duration 326, which may result in power savings. Without the last transmission information, for instance, a UE may enter the active state to transmit a retransmission in some cases where no retransmission may be scheduled or occur, which may waste power.

Figure 4:
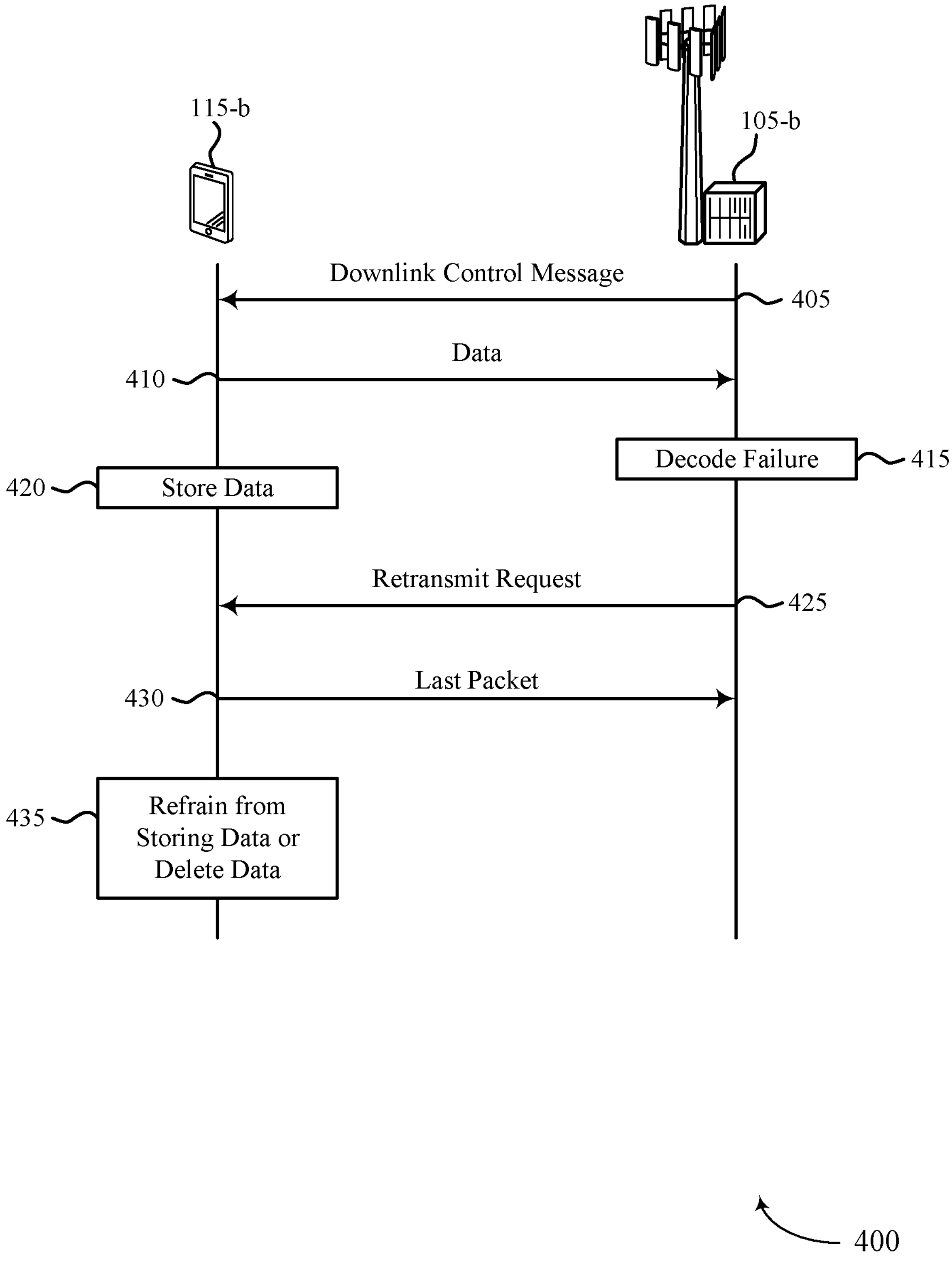
FIG. 4 shows an example of a process flow that supports last transmission indications in accordance with one or more aspects of the present disclosure.

FIG. 4 shows an example of a process flow 400 that supports last transmission indications in accordance with one or more aspects of the present disclosure. A wireless communication system may include a UE 115-*b* and a network entity 105-*b*. The UE 115-*b* may be an example of the UEs 115 or the UE 115-*a*, and the network entity 105-*b* may be an example of the network entities 105 or the network entity 105-*a*, as described herein.

In the following description of the process flow 400, the communications between the network entity 105-*b* and the UE 115-*b* may be transmitted in a different order than the example order shown, or the operations performed by the network entity 105-*b* and the UE 115-*b* may be performed in different orders or at different times. Some operations may be omitted from the process flow 400, or other operations may be added to the process flow 400. Further, although some operations or signaling may be shown to occur at different times for discussion purposes, these operations may actually occur at the same time or in overlapping time periods in some examples.

At 405, the network entity 105-*b* may output (e.g., transmit) a downlink control message to the UE 115-*b*. For example, the network entity 105-*b* may transmit a downlink control message indicating a grant of channel resources (e.g., PUSCH) for communication between the UE 115-*b* and the network entity 105-*b* as described with reference to FIG. 2. The downlink control message may indicate last transmission information corresponding to a last packet for a HARQ process associated with the grant for channel resources.

At 410, the UE 115-*b* may transmit data to the network entity 105-*b*. For example, the UE 115-*b* may transmit PUSCH data to the network entity 105-*b* as described with reference to FIG. 2. The data may be associated with a HARQ process.

At 415, the network entity 105-*b* may detect a decode failure. For instance, the data received from the UE 115-*b* may fail to be decoded successfully.

At 420, the UE 115-*b* may store data. For example, the UE 115-*b* may store data in memory for a potential retransmission as described with reference to FIG. 2.

At 425, the network entity 105-*b* may transmit a retransmit request to the UE 115-*b*. For example, the network entity 105-*b* may transmit a retransmit request for the data associated with the HARQ process (e.g., HARQ process ID) as described with reference to FIG. 2.

At 430, the UE 115-*b* may transmit a last packet to the network entity 105-*b*. For example, the UE 115-*b* may retransmit the PUSCH data that was stored in the memory as described with reference to FIG. 2.

At 435, the UE 115-*b* may refrain from storing data or may delete data. For example, the UE 115-*b* may not store data corresponding to the last packet or may delete data (e.g., the previously stored PUSCH data) from memory as described with reference to FIG. 2.

Figure 5:
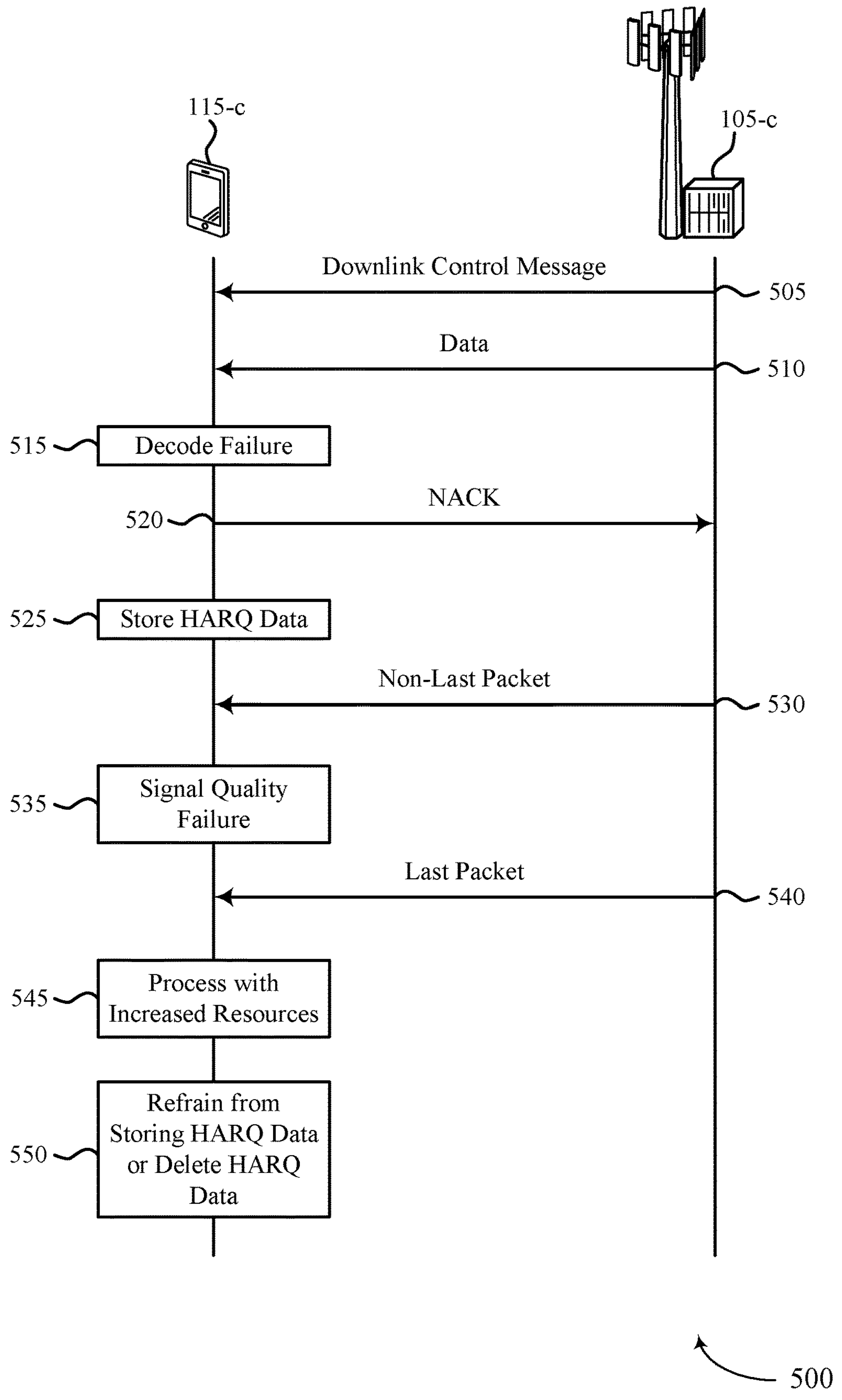
FIG. 5 shows an example of a process flow that supports last transmission indications in accordance with one or more aspects of the present disclosure.

FIG. 5 shows an example of a process flow 500 that supports last transmission indications in accordance with one or more aspects of the present disclosure. A wireless communication system may include a UE 115-*c* and a network entity 105-*c*. The UE 115-*c* may be an example of the UEs 115 or the UE 115-*a*, and the network entity 105-*c* may be an example of the network entities 105 or the network entity 105-*a*, as described herein.

In the following description of the process flow 500, the communications between the network entity 105-*c* and the UE 115-*c* may be transmitted in a different order than the example order shown, or the operations performed by the network entity 105-*c* and the UE 115-*c* may be performed in different orders or at different times. Some operations may be omitted from the process flow 500, or other operations may be added to the process flow 500. Further, although some operations or signaling may be shown to occur at different times for discussion purposes, these operations may actually occur at the same time or in overlapping time periods in some examples.

At 505, the network entity 105-*c* may output (e.g., transmit) a downlink control message to the UE 115-*b*. For example, the network entity 105-*b* may transmit a downlink control message indicating a grant of channel resources (e.g., PDSCH) for communication between the UE 115-*b* and the network entity 105-*b* as described with reference to FIG. 2. The downlink control message may indicate last transmission information corresponding to a last packet for a HARQ process associated with the grant for channel resources.

At 510, the network entity 105-*c* may transmit data to the UE 115-*c*. For example, the network entity 105-*c* may transmit PDSCH data to the network entity 105-*c* as described with reference to FIG. 2. The data may be associated with a HARQ process.

At 515, the UE 15-*c* may detect a decode failure. For instance, the data received from the UE 115-*c* may fail to be decoded successfully.

At 520, the UE 115-*c* may send a NACK to the network entity 105-*c*. For example, the UE 115-*c* may send a message indicating a NACK associated with the HARQ process (e.g., with the same HARQ process ID as with the PDSCH data).

At 525, the UE 115-*c* may store HARQ data. For example, the UE 115-*c* may store LLRs corresponding to the data that failed to be decoded successfully as described with reference to FIG. 2.

At 530, the network entity 105-*c* may a non-last packet to the UE 115-*c*. For example, the network entity 105-*c* may retransmit the PDSCH associated with the HARQ process as described with reference to FIG. 2.

At 535, the UE 115-*c* may detect a signal quality failure. For example, the UE 115-*c* may determine that a signal metric associated with the non-last packet did not satisfy a signal quality criterion as described with reference to FIG. 2. In response to detecting the signal quality failure, the UE 115-*c* may refrain from decoding the non-last packet or may refrain from storing HARQ data (e.g., LLRs) corresponding to the non-last packet as described with reference to FIG. 2.

At 540, the network entity 105-*c* may transmit a last packet. For example, the network entity 105-*c* may retransmit the PDSCH data as a last packet associated with the HARQ process as described with reference to FIG. 2.

At 545, the UE 115-*c* may process data from the last packet with increased resources. For instance, the UE 115-*c* may process data from the last packet using enhanced channel estimation, enhanced demodulation, or with increased LDPC iterations per code block as described with reference to FIG. 2. In some examples, the UE 115-*c* may soft combine the data from the last packet with the previously stored HARQ data (e.g., LLRs) to decode the data.

At 550, the UE 115-*c* may refrain from storing HARQ data or may delete HARQ data. For example, the UE 115-*c* may refrain from storing HARQ data (e.g., LLRs) corresponding to the decoding of the data from the last packet or may delete previously stored HARQ data as described with reference to FIG. 2.

Figure 6:
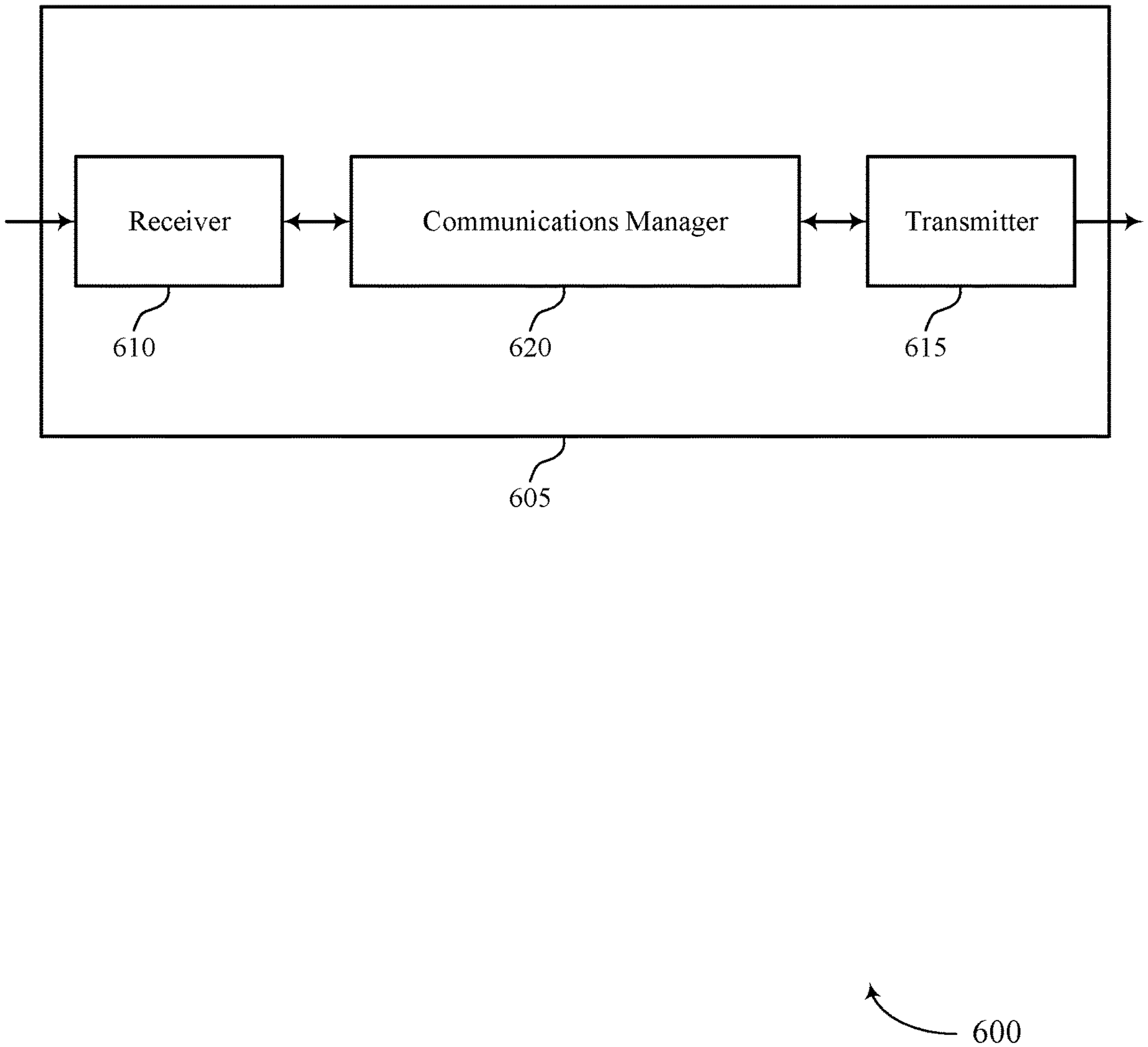
FIGS. 6 and 7 show block diagrams of devices that support last transmission indications in accordance with one or more aspects of the present disclosure.

FIG. 6 shows a block diagram 600 of a device 605 that supports last transmission indications in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to last transmission indications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to last transmission indications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of last transmission indications as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

For example, the communications manager 620 is capable of, configured to, or operable to support a means for receiving a downlink control message indicating a grant of channel resources for communication between the UE and a network entity, the downlink control message further indicating last transmission information corresponding to a last packet for a HARQ process associated with the grant of channel resources. The communications manager 620 is capable of, configured to, or operable to support a means for processing data associated with the HARQ process based on the last transmission information.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced processing, reduced power consumption, or more efficient utilization of communication resources.

Figure 7:
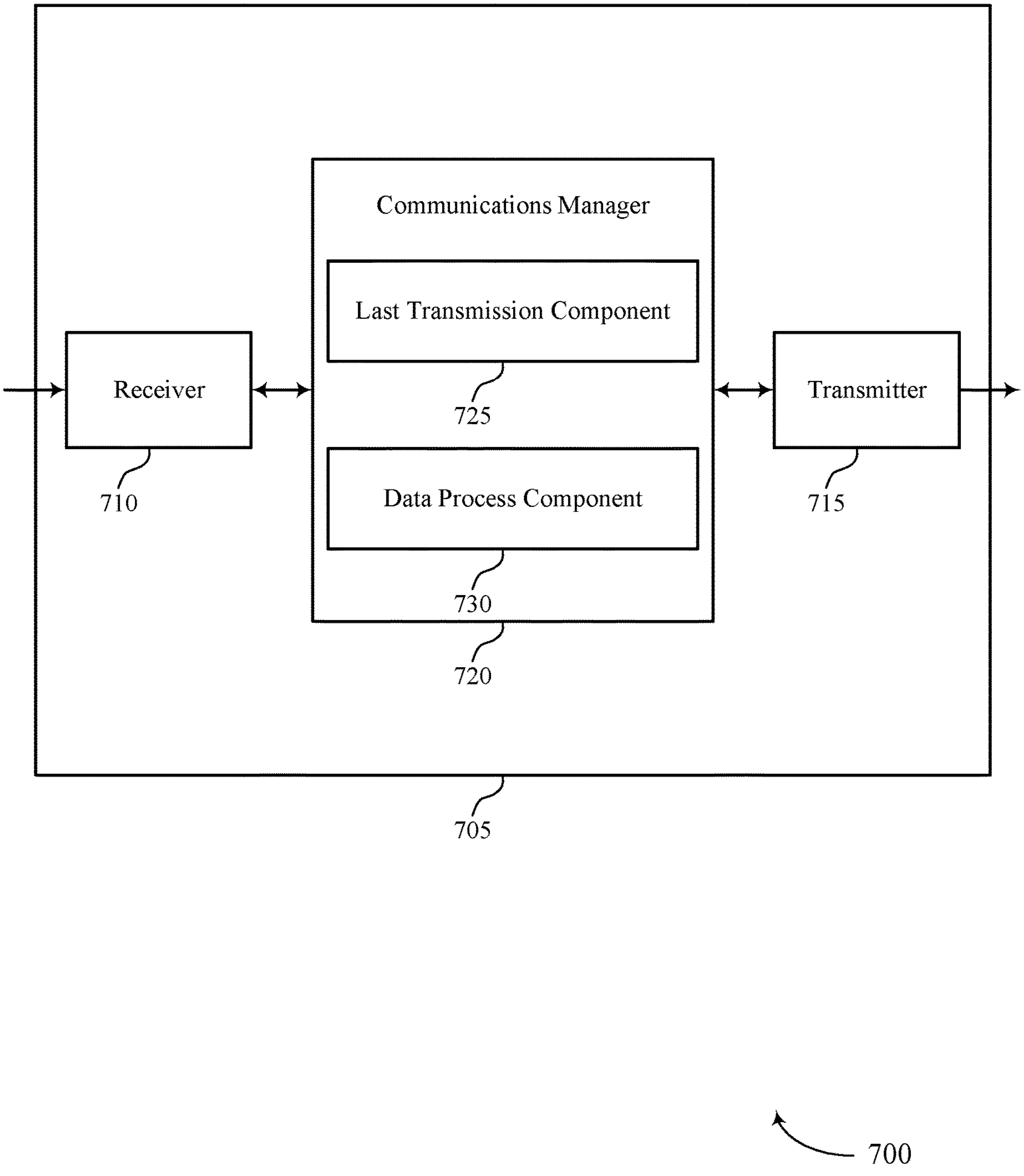

FIG. 7 shows a block diagram 700 of a device 705 that supports last transmission indications in accordance with one or more aspects of the present disclosure. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to last transmission indications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to last transmission indications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of last transmission indications as described herein. For example, the communications manager 720 may include a last transmission component 725 a data process component 730, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The last transmission component 725 is capable of, configured to, or operable to support a means for receiving a downlink control message indicating a grant of channel resources for communication between the UE and a network entity, the downlink control message further indicating last transmission information corresponding to a last packet for a HARQ process associated with the grant of channel resources. The data process component 730 is capable of, configured to, or operable to support a means for processing data associated with the HARQ process based on the last transmission information.

Figure 8:
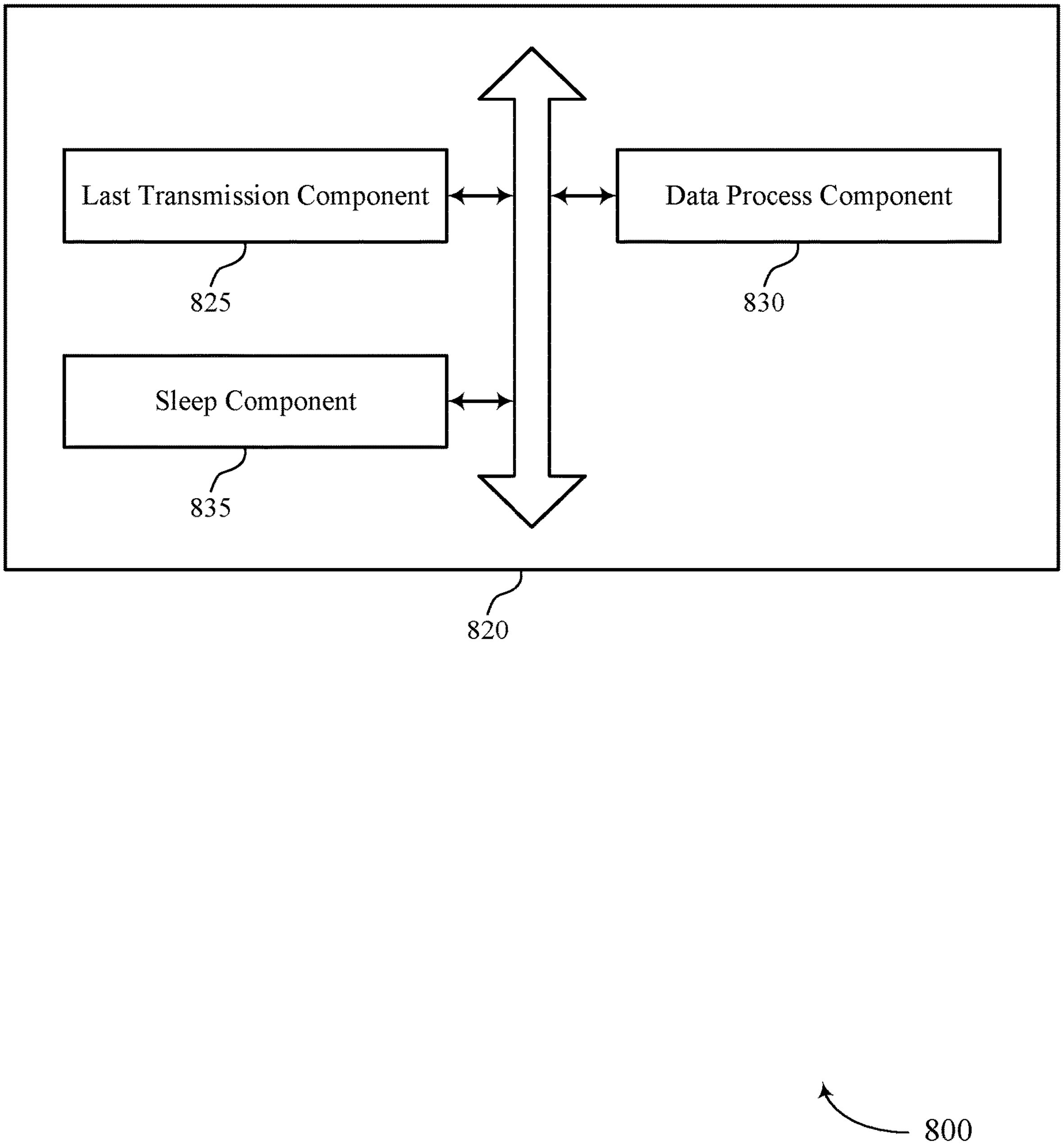
FIG. 8 shows a block diagram of a communications manager that supports last transmission indications in accordance with one or more aspects of the present disclosure.

FIG. 8 shows a block diagram 800 of a communications manager 820 that supports last transmission indications in accordance with one or more aspects of the present disclosure. The communications manager 820 may be an example of aspects of a communications manager 620, a communications manager 720, or both, as described herein. The communications manager 820, or various components thereof, may be an example of means for performing various aspects of last transmission indications as described herein. For example, the communications manager 820 may include a last transmission component 825, a data process component 830, a sleep component 835, or any combination thereof. Each of these components, or components or subcomponents thereof (e.g., one or more processors, one or more memories), may communicate, directly or indirectly, with one another (e.g., via one or more buses).

The last transmission component 825 is capable of, configured to, or operable to support a means for receiving a downlink control message indicating a grant of channel resources for communication between the UE and a network entity, the downlink control message further indicating last transmission information corresponding to a last packet for a HARQ process associated with the grant of channel resources. The data process component 830 is capable of, configured to, or operable to support a means for processing data associated with the HARQ process based on the last transmission information.

In some examples, the data process component 830 is capable of, configured to, or operable to support a means for receiving the data associated with the HARQ process, where the last transmission information indicates that the data corresponds to the last packet, and where processing the data includes processing the data corresponding to the last packet using increased resources relative to resources allocated for processing non-last packet data.

In some examples, the increased resources include increased resources for channel estimation, demodulation, decoding, or any combination thereof.

In some examples, the data process component 830 is capable of, configured to, or operable to support a means for receiving the data associated with the HARQ process, where the last transmission information indicates that the data does not correspond to the last packet, and where processing the data includes refraining from decoding the data that does not correspond to the last packet based on a signal metric associated with the data failing to satisfy a signal quality criterion.

In some examples, the data process component 830 is capable of, configured to, or operable to support a means for receiving the data associated with the HARQ process, where the last transmission information indicates that the data does not correspond to the last packet, and where processing the data includes decoding the data that does not correspond to the last packet based on a signal metric associated with the data satisfying a signal quality criterion.

In some examples, to support processing the data, the data process component 830 is capable of, configured to, or operable to support a means for deleting the data associated with the HARQ process or refraining from storing the data associated with the HARQ process based on the last transmission information indicating that the data corresponds to the last packet.

In some examples, the data process component 830 is capable of, configured to, or operable to support a means for deallocating memory resources associated with the data based on the last transmission information indicating that the data corresponds to the last packet, where deallocating the memory resources is performed in association with deleting the data or refraining from storing the data.

In some examples, the sleep component 835 is capable of, configured to, or operable to support a means for entering a sleep state and refraining from waking for a retransmission period associated with the data based on the last transmission information indicating that the data corresponds to the last packet.

In some examples, the sleep component 835 is capable of, configured to, or operable to support a means for refraining from allocating a retransmission timer based on the last transmission information indicating that the data corresponds to the last packet, where refraining from waking for the retransmission period is based on refraining from allocating the retransmission timer.

In some examples, to support processing the data, the data process component 830 is capable of, configured to, or operable to support a means for processing the data associated with the HARQ process as a new transmission based on the last transmission information indicating that a previous packet was the last packet.

In some examples, the data process component 830 is capable of, configured to, or operable to support a means for receiving a NDI associated with the data, the NDI indicating that the data corresponds to the previous packet. In some examples, the data process component 830 is capable of, configured to, or operable to support a means for determining that the data corresponds to the new transmission regardless of the NDI based on the last transmission information indicating that the previous packet was the last packet, where processing the data as the new transmission is performed based on the determination.

Figure 9:
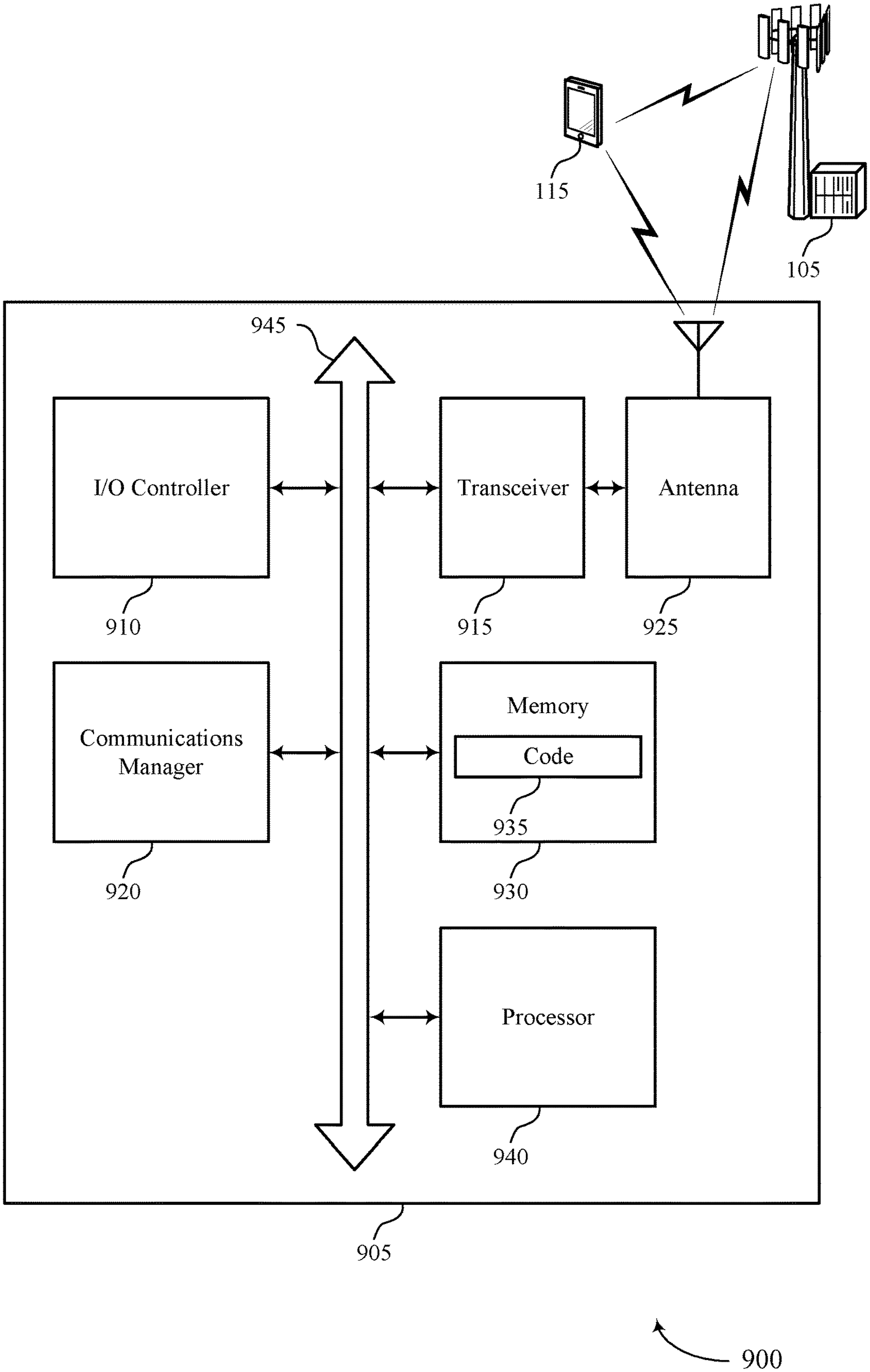
FIG. 9 shows a diagram of a system including a device that supports last transmission indications in accordance with one or more aspects of the present disclosure.

FIG. 9 shows a diagram of a system 900 including a device 905 that supports last transmission indications in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable code 935 including instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may contain, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting last transmission indications). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. For example, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 930 or otherwise, to perform one or more of the functions described herein.

For example, the communications manager 920 is capable of, configured to, or operable to support a means for receiving a downlink control message indicating a grant of channel resources for communication between the UE and a network entity, the downlink control message further indicating last transmission information corresponding to a last packet for a HARQ process associated with the grant of channel resources. The communications manager 920 is capable of, configured to, or operable to support a means for processing data associated with the HARQ process based on the last transmission information.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, or improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of last transmission indications as described herein, or the at least one processor 940 and the at least one memory 930 may be otherwise configured to, individually or collectively, perform or support such operations.

Figure 10:
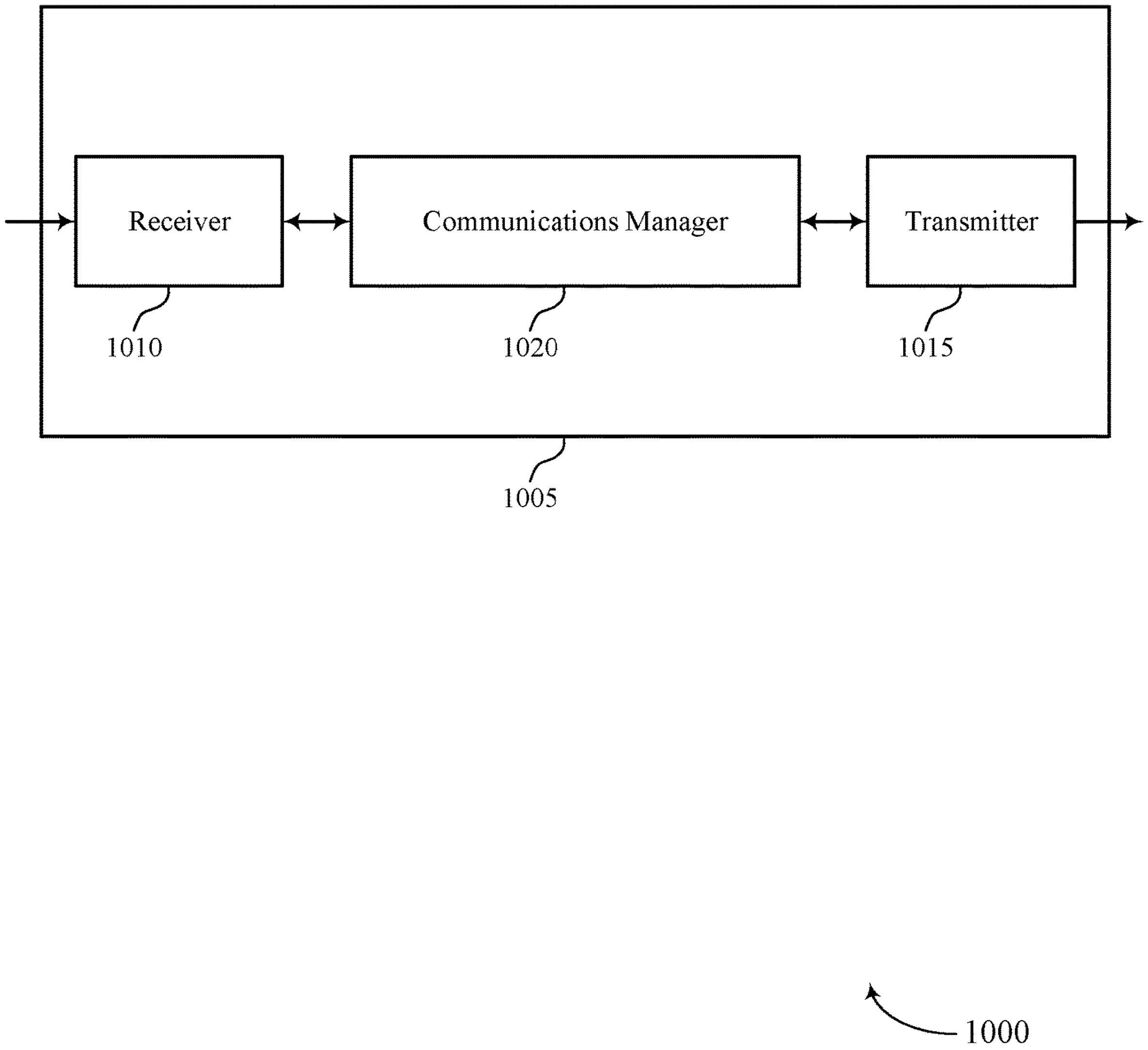
FIGS. 10 and 11 show block diagrams of devices that support last transmission indications in accordance with one or more aspects of the present disclosure.

FIG. 10 shows a block diagram 1000 of a device 1005 that supports last transmission indications in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of last transmission indications as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

For example, the communications manager 1020 is capable of, configured to, or operable to support a means for outputting a downlink control message indicating a grant of channel resources for communication between the network entity and a UE, the downlink control message further indicating last transmission information corresponding to a last packet for a HARQ process associated with the grant of channel resources. The communications manager 1020 is capable of, configured to, or operable to support a means for outputting data associated with the HARQ process based on the last transmission information.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for reduced processing, reduced power consumption, or more efficient utilization of communication resources.

Figure 11:
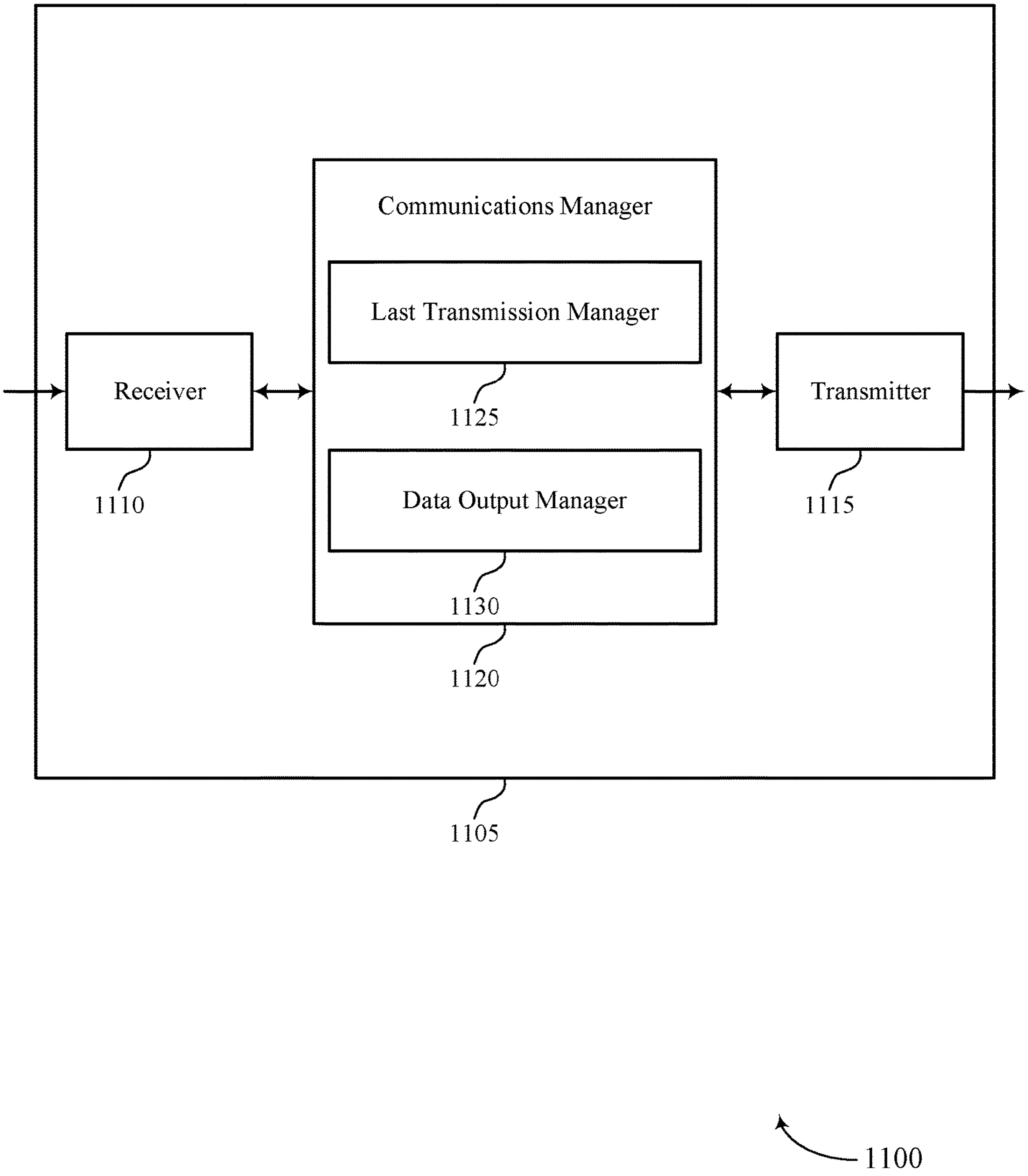

FIG. 11 shows a block diagram 1100 of a device 1105 that supports last transmission indications in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of last transmission indications as described herein. For example, the communications manager 1120 may include a last transmission manager 1125 a data output manager 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The last transmission manager 1125 is capable of, configured to, or operable to support a means for outputting a downlink control message indicating a grant of channel resources for communication between the network entity and a UE, the downlink control message further indicating last transmission information corresponding to a last packet for a HARQ process associated with the grant of channel resources. The data output manager 1130 is capable of, configured to, or operable to support a means for outputting data associated with the HARQ process based on the last transmission information.

Figure 12:
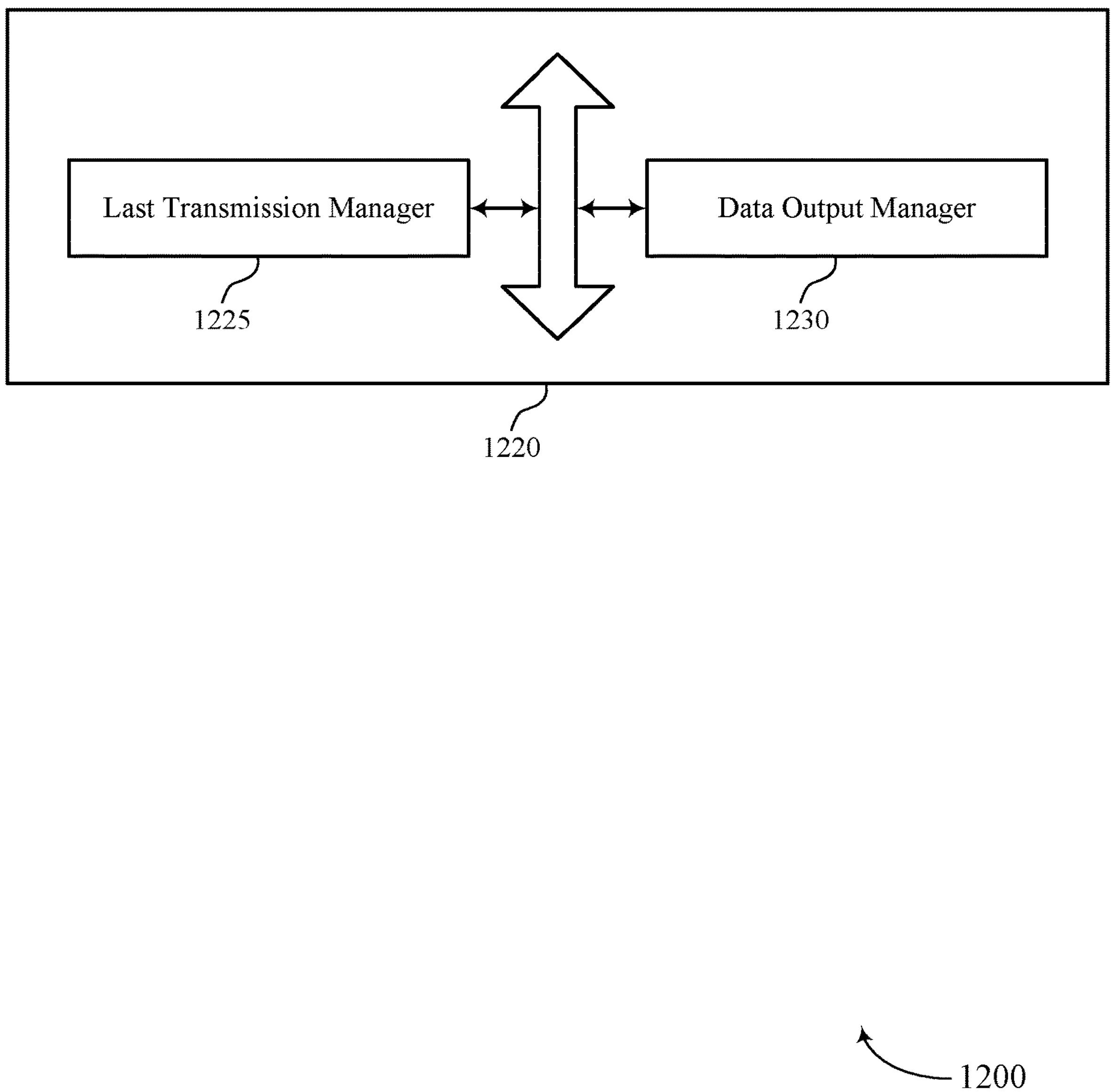
FIG. 12 shows a block diagram of a communications manager that supports last transmission indications in accordance with one or more aspects of the present disclosure.

FIG. 12 shows a block diagram 1200 of a communications manager 1220 that supports last transmission indications in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of last transmission indications as described herein. For example, the communications manager 1220 may include a last transmission manager 1225 a data output manager 1230, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The last transmission manager 1225 is capable of, configured to, or operable to support a means for outputting a downlink control message indicating a grant of channel resources for communication between the network entity and a UE, the downlink control message further indicating last transmission information corresponding to a last packet for a HARQ process associated with the grant of channel resources. The data output manager 1230 is capable of, configured to, or operable to support a means for outputting data associated with the HARQ process based on the last transmission information.

In some examples, the last transmission information indicates that the data corresponds to the last packet.

In some examples, the data output manager 1230 is capable of, configured to, or operable to support a means for outputting a retransmission of the data associated with the HARQ process, where the last transmission information indicates that the data does not correspond to the last packet.

In some examples, the data output manager 1230 is capable of, configured to, or operable to support a means for refraining from outputting a retransmission of the data in a retransmission period associated with the data based on the last transmission information indicating that the data corresponds to the last packet.

In some examples, the data output manager 1230 is capable of, configured to, or operable to support a means for refraining from allocating a retransmission timer based on the last transmission information indicating that the data corresponds to the last packet, where refraining from outputting the retransmission of the data is based on refraining from allocating the retransmission timer.

In some examples, to support outputting the data, the data output manager 1230 is capable of, configured to, or operable to support a means for outputting the data associated with the HARQ process as a new transmission based on the last transmission information indicating that a previous packet was the last packet.

Figure 13:
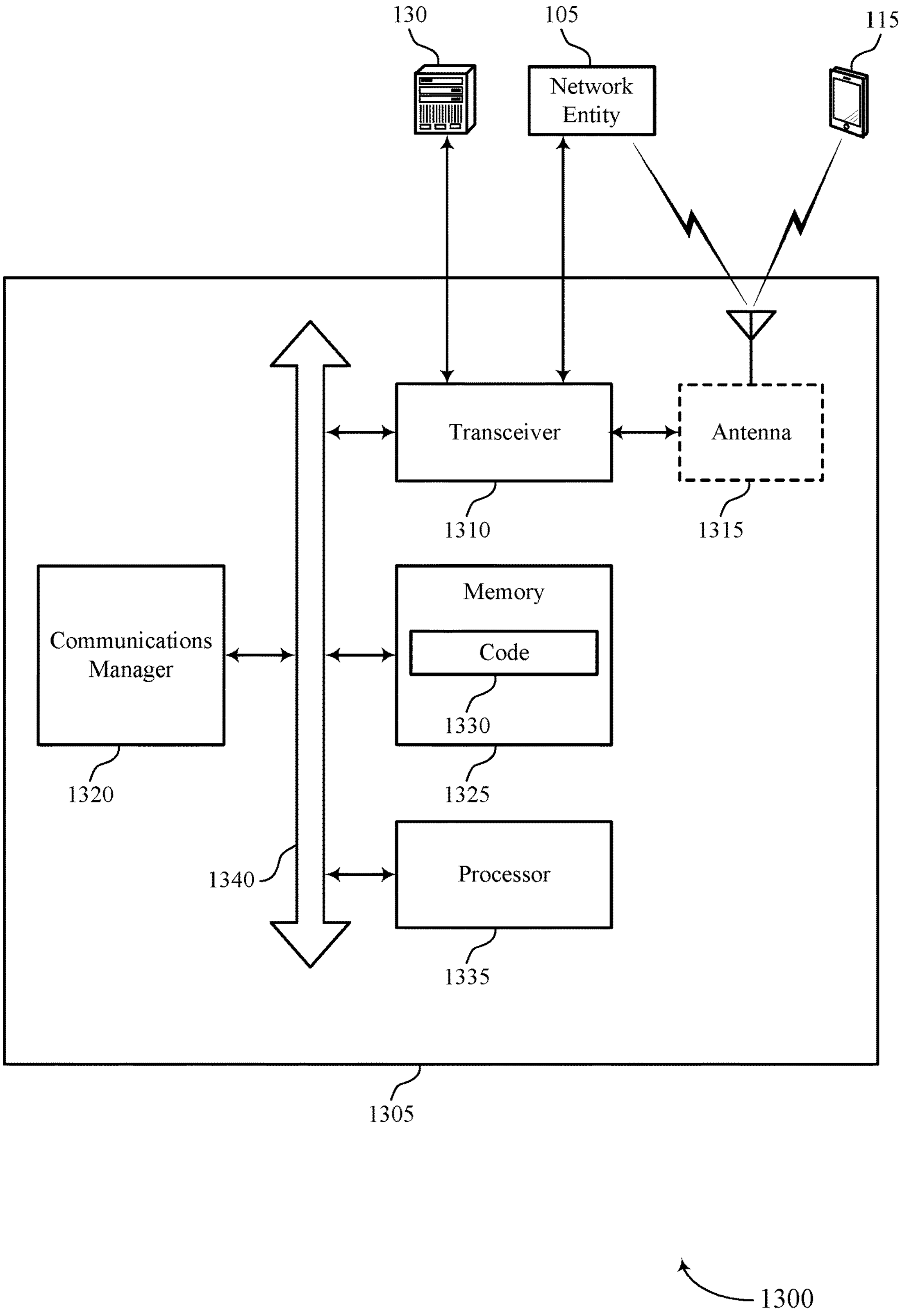
FIG. 13 shows a diagram of a system including a device that supports last transmission indications in accordance with one or more aspects of the present disclosure.

FIG. 13 shows a diagram of a system 1300 including a device 1305 that supports last transmission indications in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., a communication link 125, a backhaul communication link 120, a midhaul communication link 162, a fronthaul communication link 168).

The at least one memory 1325 may include RAM, ROM, or any combination thereof. The at least one memory 1325 may store computer-readable, computer-executable code 1330 including instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may contain, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting last transmission indications). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. For example, the at least one processor 1335 or a processing system including the at least one processor 1335 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

For example, the communications manager 1320 is capable of, configured to, or operable to support a means for outputting a downlink control message indicating a grant of channel resources for communication between the network entity and a UE, the downlink control message further indicating last transmission information corresponding to a last packet for a HARQ process associated with the grant of channel resources. The communications manager 1320 is capable of, configured to, or operable to support a means for outputting data associated with the HARQ process based on the last transmission information.

By including or configuring the communications manager 1320 in accordance with examples as described herein, the device 1305 may support techniques for improved communication reliability, reduced latency, improved user experience related to reduced processing, reduced power consumption, more efficient utilization of communication resources, improved coordination between devices, longer battery life, or improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of last transmission indications as described herein, or the at least one processor 1335 and the at least one memory 1325 may be otherwise configured to, individually or collectively, perform or support such operations.

Figure 14:
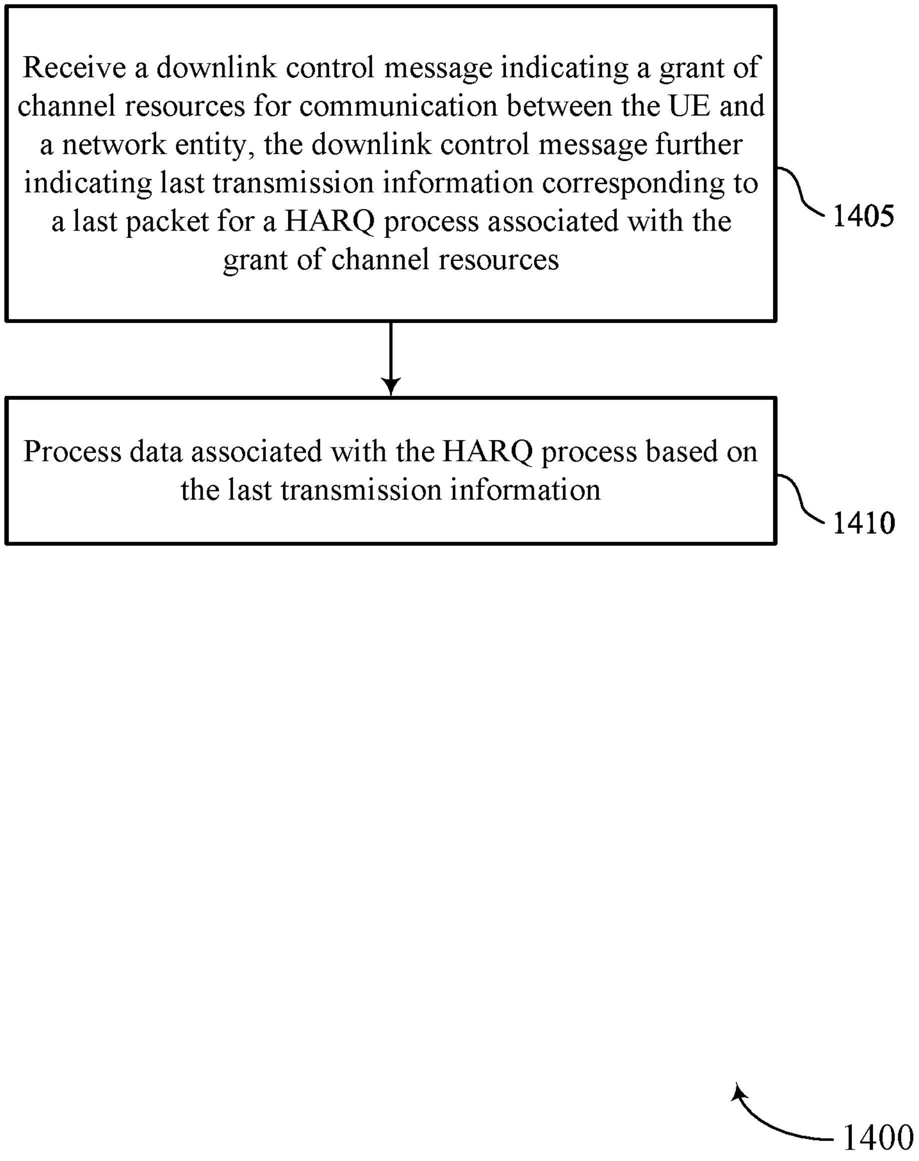

FIG. 14 shows a flowchart illustrating a method 1400 that supports last transmission indications in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a downlink control message indicating a grant of channel resources for communication between the UE and a network entity, the downlink control message further indicating last transmission information corresponding to a last packet for a HARQ process associated with the grant of channel resources. The operations of block 1405 may be performed in accordance with examples as disclosed herein. In some examples, aspects of the operations of 1405 may be performed by a last transmission component 825 as described with reference to FIG. 8.

At 1410, the method may include processing data associated with the HARQ process based on the last transmission information. The operations of block 1410 may be performed in accordance with examples as disclosed herein. In some examples, aspects of the operations of 1410 may be performed by a data process component 830 as described with reference to FIG. 8.

Figure 15:
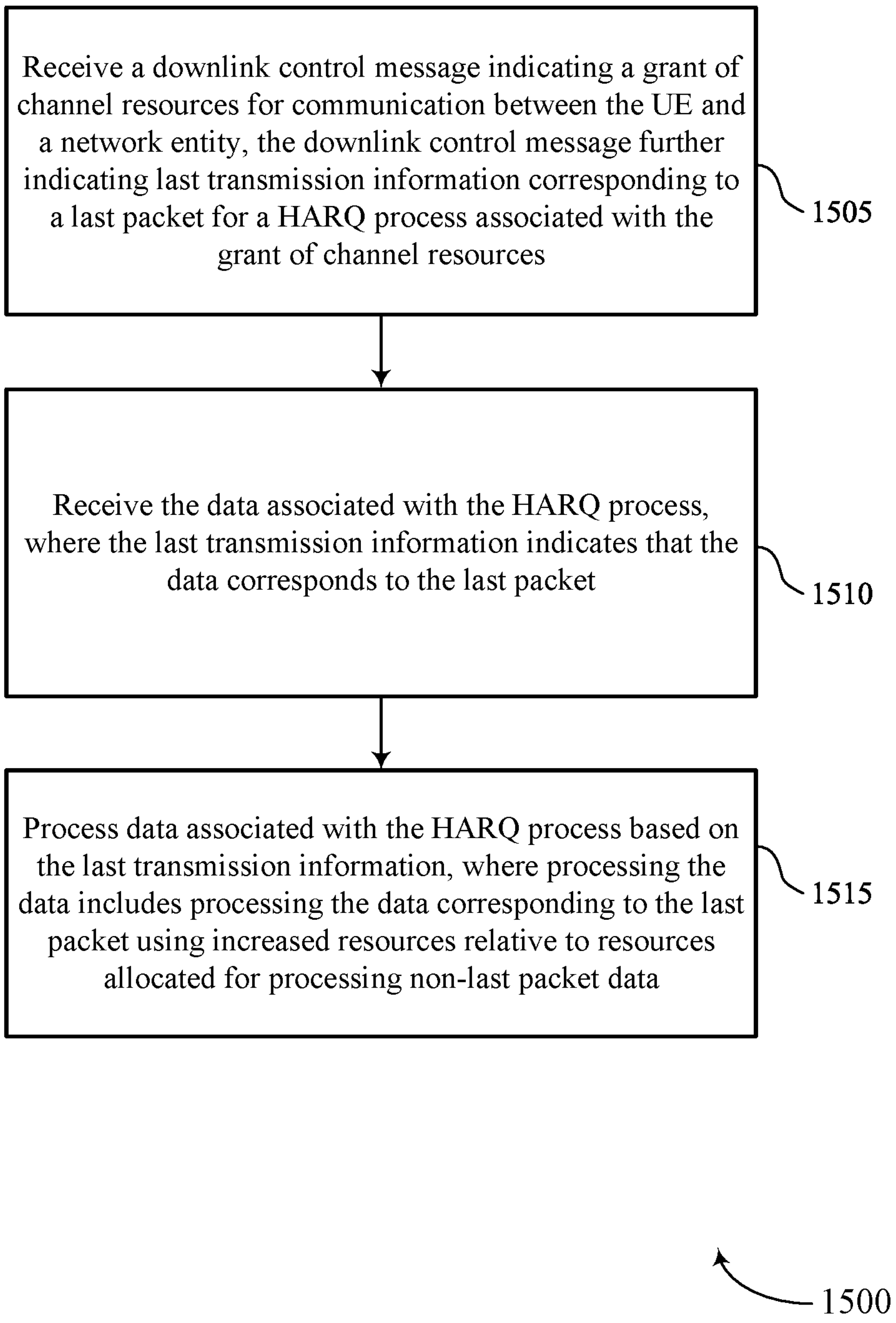

FIG. 15 shows a flowchart illustrating a method 1500 that supports last transmission indications in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving a downlink control message indicating a grant of channel resources for communication between the UE and a network entity, the downlink control message further indicating last transmission information corresponding to a last packet for a HARQ process associated with the grant of channel resources. The operations of block 1505 may be performed in accordance with examples as disclosed herein. In some examples, aspects of the operations of 1505 may be performed by a last transmission component 825 as described with reference to FIG. 8.

At 1510, the method may include receiving the data associated with the HARQ process, where the last transmission information indicates that the data corresponds to the last packet. The operations of block 1510 may be performed in accordance with examples as disclosed herein. In some examples, aspects of the operations of 1510 may be performed by a data process component 830 as described with reference to FIG. 8.

At 1515, the method may include processing data associated with the HARQ process based on the last transmission information, where processing the data includes processing the data corresponding to the last packet using increased resources relative to resources allocated for processing non-last packet data. The operations of block 1515 may be performed in accordance with examples as disclosed herein. In some examples, aspects of the operations of 1515 may be performed by a data process component 830 as described with reference to FIG. 8.

FIG. 16 shows a flowchart illustrating a method 1600 that supports last transmission indications in accordance with aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include outputting a downlink control message indicating a grant of channel resources for communication between the network entity and a UE, the downlink control message further indicating last transmission information corresponding to a last packet for a HARQ process associated with the grant of channel resources. The operations of block 1605 may be performed in accordance with examples as disclosed herein. In some examples, aspects of the operations of 1605 may be performed by a last transmission manager 1225 as described with reference to FIG. 12.

At 1610, the method may include outputting data associated with the HARQ process based on the last transmission information. The operations of block 1610 may be performed in accordance with examples as disclosed herein. In some examples, aspects of the operations of 1610 may be performed by a data output manager 1230 as described with reference to FIG. 12.

Figure 17:
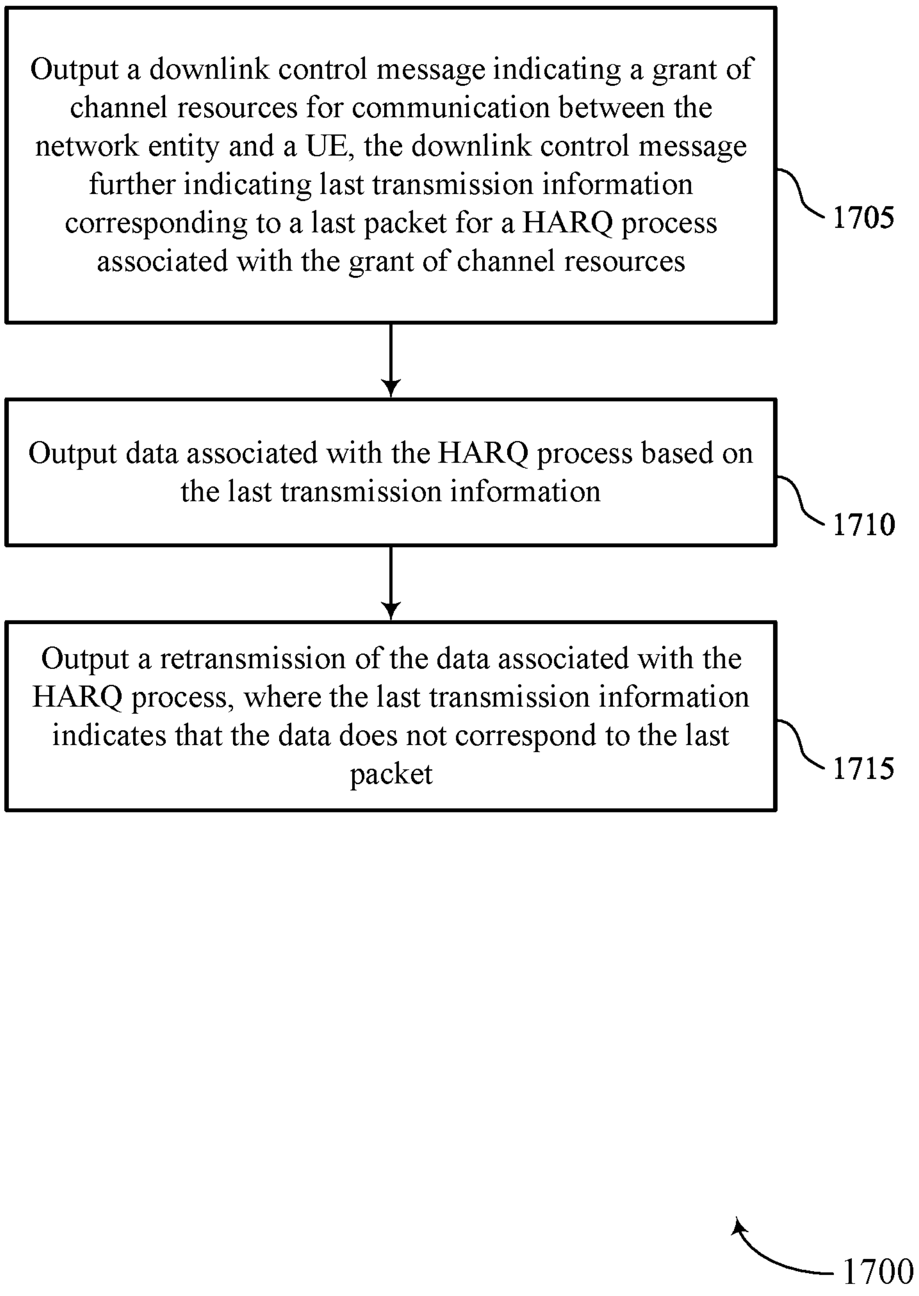

FIG. 17 shows a flowchart illustrating a method 1700 that supports last transmission indications in accordance with aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include outputting a downlink control message indicating a grant of channel resources for communication between the network entity and a UE, the downlink control message further indicating last transmission information corresponding to a last packet for a HARQ process associated with the grant of channel resources. The operations of block 1705 may be performed in accordance with examples as disclosed herein. In some examples, aspects of the operations of 1705 may be performed by a last transmission manager 1225 as described with reference to FIG. 12.

At 1710, the method may include outputting data associated with the HARQ process based on the last transmission information. The operations of block 1710 may be performed in accordance with examples as disclosed herein. In some examples, aspects of the operations of 1710 may be performed by a data output manager 1230 as described with reference to FIG. 12.

At 1715, the method may include outputting a retransmission of the data associated with the HARQ process, where the last transmission information indicates that the data does not correspond to the last packet. The operations of block 1715 may be performed in accordance with examples as disclosed herein. In some examples, aspects of the operations of 1715 may be performed by a data output manager 1230 as described with reference to FIG. 12.

The following provides an overview of aspects of the present disclosure:

Aspect 1: A method for wireless communications by a UE, comprising: receiving a downlink control message indicating a grant of channel resources for communication between the UE and a network entity, the downlink control message further indicating last transmission information corresponding to a last packet for a HARQ process associated with the grant of channel resources; and processing data associated with the HARQ process based at least in part on the last transmission information.

Aspect 2: The method of aspect 1, further comprising: receiving the data associated with the HARQ process, wherein the last transmission information indicates that the data corresponds to the last packet, and wherein processing the data comprises processing the data corresponding to the last packet using increased resources relative to resources allocated for processing non-last packet data.

Aspect 3: The method of aspect 2, wherein the increased resources comprise increased resources for channel estimation, demodulation, decoding, or any combination thereof.

Aspect 4: The method of aspect 1, further comprising: receiving the data associated with the HARQ process, wherein the last transmission information indicates that the data does not correspond to the last packet, and wherein processing the data comprises refraining from decoding the data that does not correspond to the last packet based at least in part on a signal metric associated with the data failing to satisfy a signal quality criterion.

Aspect 5: The method of aspect 1, further comprising: receiving the data associated with the HARQ process, wherein the last transmission information indicates that the data does not correspond to the last packet, and wherein processing the data comprises decoding the data that does not correspond to the last packet based at least in part on a signal metric associated with the data satisfying a signal quality criterion.

Aspect 6: The method of any of aspects 1 through 3, wherein processing the data comprises: deleting the data associated with the HARQ process or refraining from storing the data associated with the HARQ process based at least in part on the last transmission information indicating that the data corresponds to the last packet.

Aspect 7: The method of aspect 6, further comprising: deallocating memory resources associated with the data based at least in part on the last transmission information indicating that the data corresponds to the last packet, wherein deallocating the memory resources is performed in association with deleting the data or refraining from storing the data.

Aspect 8: The method of any of aspects 1 through 3, 6, and 7, further comprising: entering a sleep state and refraining from waking for a retransmission period associated with the data based at least in part on the last transmission information indicating that the data corresponds to the last packet.

Aspect 9: The method of aspect 8, further comprising: refraining from allocating a retransmission timer based at least in part on the last transmission information indicating that the data corresponds to the last packet, wherein refraining from waking for the retransmission period is based at least in part on refraining from allocating the retransmission timer.

Aspect 10: The method of any of aspects 1, 4, and 5, wherein processing the data comprises: processing the data associated with the HARQ process as a new transmission based at least in part on the last transmission information indicating that a previous packet was the last packet.

Aspect 11: The method of aspect 10, further comprising: receiving a NDI associated with the data, the NDI indicating that the data corresponds to the previous packet; and determining that the data corresponds to the new transmission regardless of the NDI based at least in part on the last transmission information indicating that the previous packet was the last packet, wherein processing the data as the new transmission is performed based at least in part on the determination.

Aspect 12: A method for wireless communications by a network entity, comprising: outputting a downlink control message indicating a grant of channel resources for communication between the network entity and a UE, the downlink control message further indicating last transmission information corresponding to a last packet for a HARQ process associated with the grant of channel resources; and outputting data associated with the HARQ process based at least in part on the last transmission information.

Aspect 13: The method of aspect 12, wherein the last transmission information indicates that the data corresponds to the last packet.

Aspect 14: The method of aspect 12, further comprising: outputting a retransmission of the data associated with the HARQ process, wherein the last transmission information indicates that the data does not correspond to the last packet.

Aspect 15: The method of any of aspects 12 and 13, further comprising: refraining from outputting a retransmission of the data in a retransmission period associated with the data based at least in part on the last transmission information indicating that the data corresponds to the last packet.

Aspect 16: The method of aspect 15, further comprising: refraining from allocating a retransmission timer based at least in part on the last transmission information indicating that the data corresponds to the last packet, wherein refraining from outputting the retransmission of the data is based at least in part on refraining from allocating the retransmission timer.

Aspect 17: The method of aspect 12, wherein outputting the data comprises: outputting the data associated with the HARQ process as a new transmission based at least in part on the last transmission information indicating that a previous packet was the last packet.

Aspect 18: A UE comprising one or more memories storing processor-executable code, and one or more processors coupled with the one or more memories and individually or collectively operable to execute the code to cause the UE to perform a method of any of aspects 1 through 11.

Aspect 19: A UE comprising at least one means for performing a method of any of aspects 1 through 11.

Aspect 20: A non-transitory computer-readable medium storing code the code comprising instructions executable by one or more processors to perform a method of any of aspects 1 through 11.

Aspect 21: A network entity comprising one or more memories storing processor-executable code, and one or more processors coupled with the one or more memories and individually or collectively operable to execute the code to cause the network entity to perform a method of any of aspects 12 through 17.

Aspect 22: A network entity comprising at least one means for performing a method of any of aspects 12 through 17.

Aspect 23: A non-transitory computer-readable medium storing code the code comprising instructions executable by one or more processors to perform a method of any of aspects 12 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
receive a downlink control message indicating a grant of channel resources for communication between the UE and a network entity, the downlink control message further indicating last transmission information corresponding to a last packet for a hybrid automatic repeat request process associated with the grant of channel resources;
receive data associated with the hybrid automatic repeat request process, wherein the last transmission information indicates that the data corresponds to the last packet; and
process the data associated with the hybrid automatic repeat request process based at least in part on the last transmission information, the data corresponding to the last packet processed using increased resources relative to resources allocated for processing a non-last data packet.

2. The UE of claim 1, wherein the increased resources comprise increased resources for channel estimation, demodulation, decoding, or any combination thereof.

3. The UE of claim 1, wherein the one or more processors are individually or collectively further operable to execute the code to cause the UE to:
receive second data associated with the hybrid automatic repeat request process, wherein the last transmission information indicates that the second data does not correspond to the last packet; and
refrain from decoding the second data that does not correspond to the last packet based at least in part on a signal metric associated with the second data failing to satisfy a signal quality criterion.

4. The UE of claim 1, wherein the one or more processors are individually or collectively further operable to execute the code to cause the UE to:
receive second data associated with the hybrid automatic repeat request process, wherein the last transmission information indicates that the second data does not correspond to the last packet; and
decode the second data that does not correspond to the last packet based at least in part on a signal metric associated with the second data satisfying a signal quality criterion.

5. The UE of claim 1, wherein, to process the data, the one or more processors are individually or collectively operable to execute the code to cause the UE to:
delete the data associated with the hybrid automatic repeat request process or refrain from storing the data associated with the hybrid automatic repeat request process based at least in part on the last transmission information indicating that the data corresponds to the last packet.

6. The UE of claim 5, wherein the one or more processors are individually or collectively further operable to execute the code to cause the UE to:
deallocate memory resources associated with the data based at least in part on the last transmission information indicating that the data corresponds to the last packet, wherein deallocating the memory resources is performed in association with deleting the data or refraining from storing the data.

7. The UE of claim 1, wherein the one or more processors are individually or collectively further operable to execute the code to cause the UE to:
enter a sleep state and refrain from waking for a retransmission period associated with the data based at least in part on the last transmission information indicating that the data corresponds to the last packet.

8. The UE of claim 7, wherein the one or more processors are individually or collectively further operable to execute the code to cause the UE to:
refrain from allocating a retransmission timer based at least in part on the last transmission information indicating that the data corresponds to the last packet, wherein refraining from waking for the retransmission period is based at least in part on refraining from allocating the retransmission timer.

9. The UE of claim 1, wherein the one or more processors are individually or collectively further operable to execute the code to cause the UE to:
process second data associated with the hybrid automatic repeat request process as a new transmission based at least in part on the last transmission information indicating that a previous packet was the last packet.

10. The UE of claim 9, wherein the one or more processors are individually or collectively further operable to execute the code to cause the UE to:
receive a new data indicator associated with the second data, the new data indicator indicating that the second data corresponds to the previous packet; and
determine that the second data corresponds to the new transmission regardless of the new data indicator based at least in part on the last transmission information indicating that the previous packet was the last packet, wherein processing the second data as the new transmission is performed based at least in part on the determination.

11. A network entity, comprising:
one or more memories storing processor-executable code; and
one or more processors coupled with the one or more memories and individually or collectively operable to execute the code to cause the network entity to:
output a downlink control message indicating a grant of channel resources for communication between the network entity and a user equipment (UE), the downlink control message further indicating last transmission information corresponding to a last packet for a hybrid automatic repeat request process associated with the grant of channel resources;
output data associated with the hybrid automatic repeat request process based at least in part on the last transmission information; and
refrain from outputting a retransmission of the data in a retransmission period associated with the data based at least in part on the last transmission information indicating that the data corresponds to the last packet.

12. The network entity of claim 11, wherein the one or more processors are individually or collectively further operable to execute the code to cause the network entity to:
output a retransmission of second data associated with the hybrid automatic repeat request process, wherein the last transmission information indicates that the second data does not correspond to the last packet.

13. The network entity of claim 11, wherein the one or more processors are individually or collectively further operable to execute the code to cause the network entity to:

refrain from allocating a retransmission timer based at least in part on the last transmission information indicating that the data corresponds to the last packet, wherein refraining from outputting the retransmission of the data is based at least in part on refraining from allocating the retransmission timer.

14. The network entity of claim 11, wherein the one or more processors are individually or collectively further operable to execute the code to cause the network entity to:

output second data associated with the hybrid automatic repeat request process as a new transmission based at least in part on the last transmission information indicating that a previous packet was the last packet.

15. A method for wireless communications by a user equipment (UE), comprising:

receiving a downlink control message indicating a grant of channel resources for communication between the UE and a network entity, the downlink control message further indicating last transmission information corresponding to a last packet for a hybrid automatic repeat request process associated with the grant of channel resources;

receiving data associated with the hybrid automatic repeat request process, wherein the last transmission information indicates that the data corresponds to the last packet; and processing the data associated with the hybrid automatic repeat request process based at least in part on the last transmission information, the data corresponding to the last packet processed using increased resources relative to resources allocated for processing a non-last data packet.

16. The method of claim 15, wherein the increased resources comprise increased resources for channel estimation, demodulation, decoding, or any combination thereof.

17. The method of claim 15, further comprising:

receiving second data associated with the hybrid automatic repeat request process, wherein the last transmission information indicates that the second data does not correspond to the last packet; and refraining from decoding the second data that does not correspond to the last packet based at least in part on a signal metric associated with the second data failing to satisfy a signal quality criterion.

18. The method of claim 15, further comprising:

receiving second data associated with the hybrid automatic repeat request process, wherein the last transmission information indicates that the second data does not correspond to the last packet; and decoding the second data that does not correspond to the last packet based at least in part on a signal metric associated with the second data satisfying a signal quality criterion.

19. The method of claim 15, wherein processing the data comprises:

deleting the data associated with the hybrid automatic repeat request process or refraining from storing the data associated with the hybrid automatic repeat request process based at least in part on the last transmission information indicating that the data corresponds to the last packet.

20. The method of claim 19, wherein processing the data comprises:

deallocating memory resources associated with the data based at least in part on the last transmission information indicating that the data corresponds to the last packet, wherein deallocating the memory resources is performed in association with deleting the data or refraining from storing the data.

21. The method of claim 15, further comprising:

entering a sleep state and refraining from waking for a retransmission period associated with the data based at least in part on the last transmission information indicating that the data corresponds to the last packet.

22. The method of claim 21, further comprising:

refraining from allocating a retransmission timer based at least in part on the last transmission information indicating that the data corresponds to the last packet, wherein refraining from waking for the retransmission period is based at least in part on refraining from allocating the retransmission timer.

23. The method of claim 15, further comprising:

processing second data associated with the hybrid automatic repeat request process as a new transmission based at least in part on the last transmission information indicating that a previous packet was the last packet.

24. The method of claim 23, further comprising:

receiving a new data indicator associated with the second data, the new data indicator indicating that the second data corresponds to the previous packet; and determining that the second data corresponds to the new transmission regardless of the new data indicator based at least in part on the last transmission information indicating that the previous packet was the last packet, wherein processing the second data as the new transmission is performed based at least in part on the determination.

25. A method for wireless communications by a network entity, comprising:

outputting a downlink control message indicating a grant of channel resources for communication between the network entity and a user equipment (UE), the downlink control message further indicating last transmission information corresponding to a last packet for a hybrid automatic repeat request process associated with the grant of channel resources;

outputting data associated with the hybrid automatic repeat request process based at least in part on the last transmission information; and refraining from outputting a retransmission of the data in a retransmission period associated with the data based at least in part on the last transmission information indicating that the data corresponds to the last packet.

26. The method of claim 25, further comprising:

outputting a retransmission of second data associated with the hybrid automatic repeat request process, wherein the last transmission information indicates that the second data does not correspond to the last packet.

27. The method of claim 25, further comprising:

outputting second data associated with the hybrid automatic repeat request process as a new transmission based at least in part on the last transmission information indicating that a previous packet was the last packet.

28. The method of claim 25, further comprising:

refraining from allocating a retransmission timer based at least in part on the last transmission information indicating that the data corresponds to the last packet, wherein refraining from outputting the retransmission of the data is based at least in part on refraining from allocating the retransmission timer.

* * * * *